United States Patent [19]
Miyaoku et al.

[11] Patent Number: 5,584,005
[45] Date of Patent: Dec. 10, 1996

[54] VIRTUAL MEMORY ADDRESS TRANSLATION APPARATUS AND METHOD USING LINK, AUXILIARY LINK AND PAGE TABLES

[75] Inventors: Hitoshi Miyaoku; Hiromasa Takahashi, both of Kawasaki, Japan

[73] Assignee: Fujitsu Limited, Kawasaki, Japan

[21] Appl. No.: 123,474

[22] Filed: Sep. 20, 1993

[30] Foreign Application Priority Data

Feb. 5, 1993 [JP] Japan ................... 5-018335

[51] Int. Cl.⁶ ........................... G06F 12/10
[52] U.S. Cl. ............ 395/416; 395/418; 395/421.06; 395/421.11
[58] Field of Search ............... 364/200; 399/416, 399/418, 421.06, 421.11

[56] References Cited

U.S. PATENT DOCUMENTS

| | | | |
|---|---|---|---|
| 4,215,402 | 7/1980 | Mitchell et al. | 364/200 |
| 4,218,743 | 8/1980 | Hoffman et al. | 395/417 |
| 4,356,549 | 10/1982 | Chueh | 364/200 |
| 4,680,700 | 7/1987 | Hester et al. | 364/200 |
| 5,023,777 | 6/1991 | Sawamoto | 364/200 |
| 5,129,070 | 7/1992 | Dorotte | 395/400 |
| 5,287,475 | 2/1994 | Sawamoto | 395/425 |

FOREIGN PATENT DOCUMENTS

| | | |
|---|---|---|
| 0251861 | 1/1988 | European Pat. Off. . |
| 0421845 | 4/1991 | European Pat. Off. . |
| 3833933 | 4/1989 | Germany . |

Primary Examiner—David K. Moore
Assistant Examiner—Kevin Verbrugge
Attorney, Agent, or Firm—Staas & Halsey

[57] ABSTRACT

In a method and apparatus for address translation for translating a 64-bit virtual address into a real address, the 64-bit virtual address comprises a segment number, a page index and a page offset. When this virtual address is translated into a real address, high order bits of the segment number are first input to a hash generation circuit to obtain a hash address of a link table, and this link table is retrieved by an address obtained by adding lower order bits of the segment number as an offset to obtain tag information of the virtual address and a base address of a page table. Next, the tag information of the virtual address obtained in this manner is compared with the original segment number, and the base address of the page table is judged as correct when they coincide with each other. The page table is retrieved by an address obtained by adding a page index as an offset to this base address to obtain a page frame number, and the real address is obtained by combining the original page offset with the page frame number. According to this construction, address translation can be carried out at a higher speed while maintaining compatibility with the 32-bit virtual address.

20 Claims, 21 Drawing Sheets

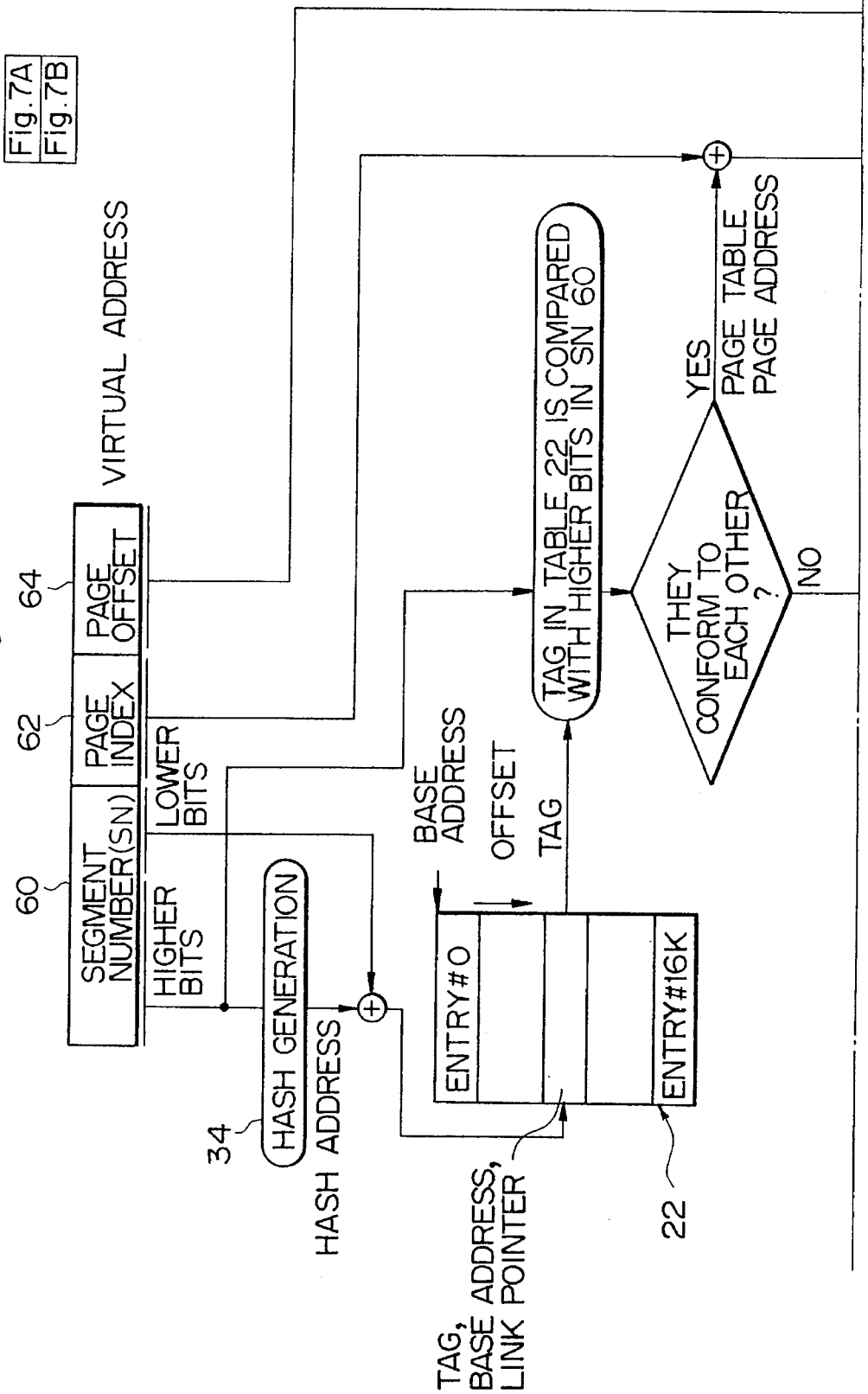

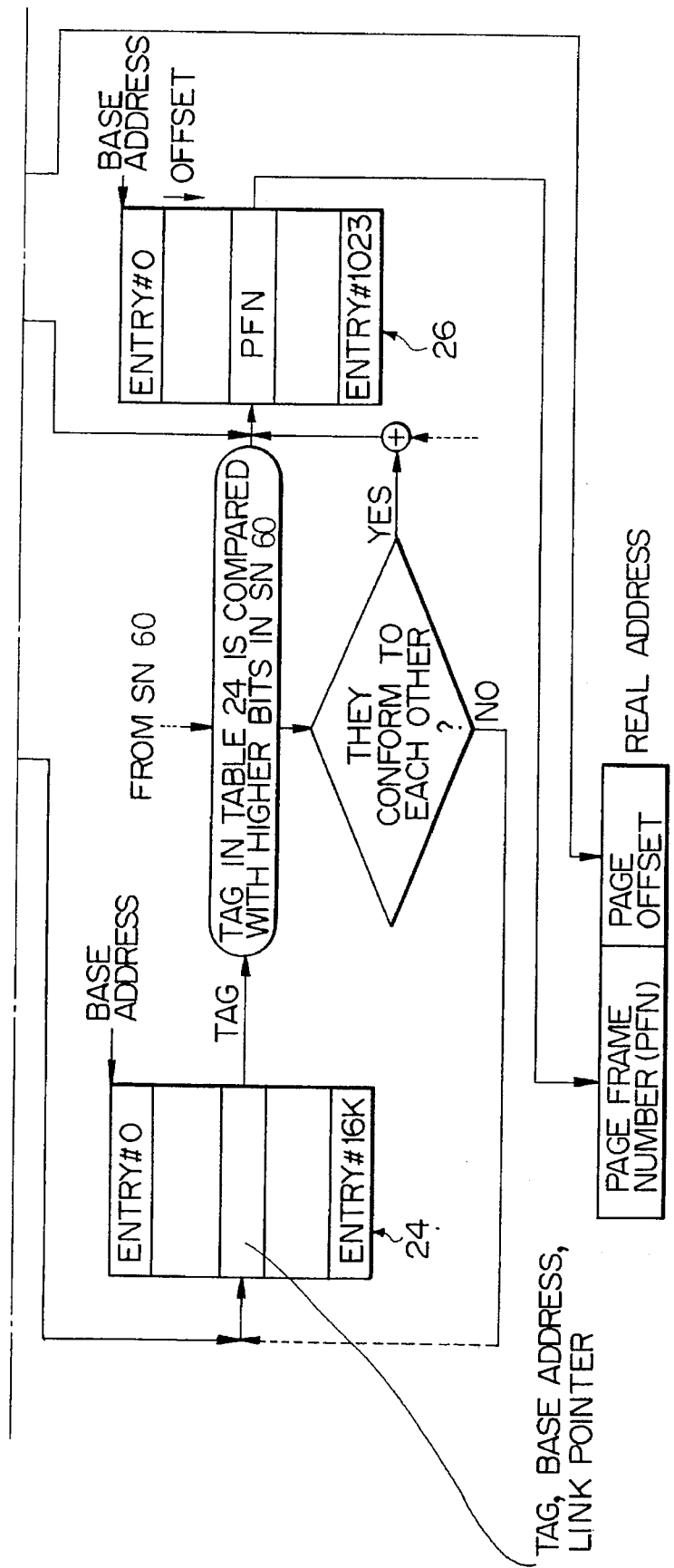

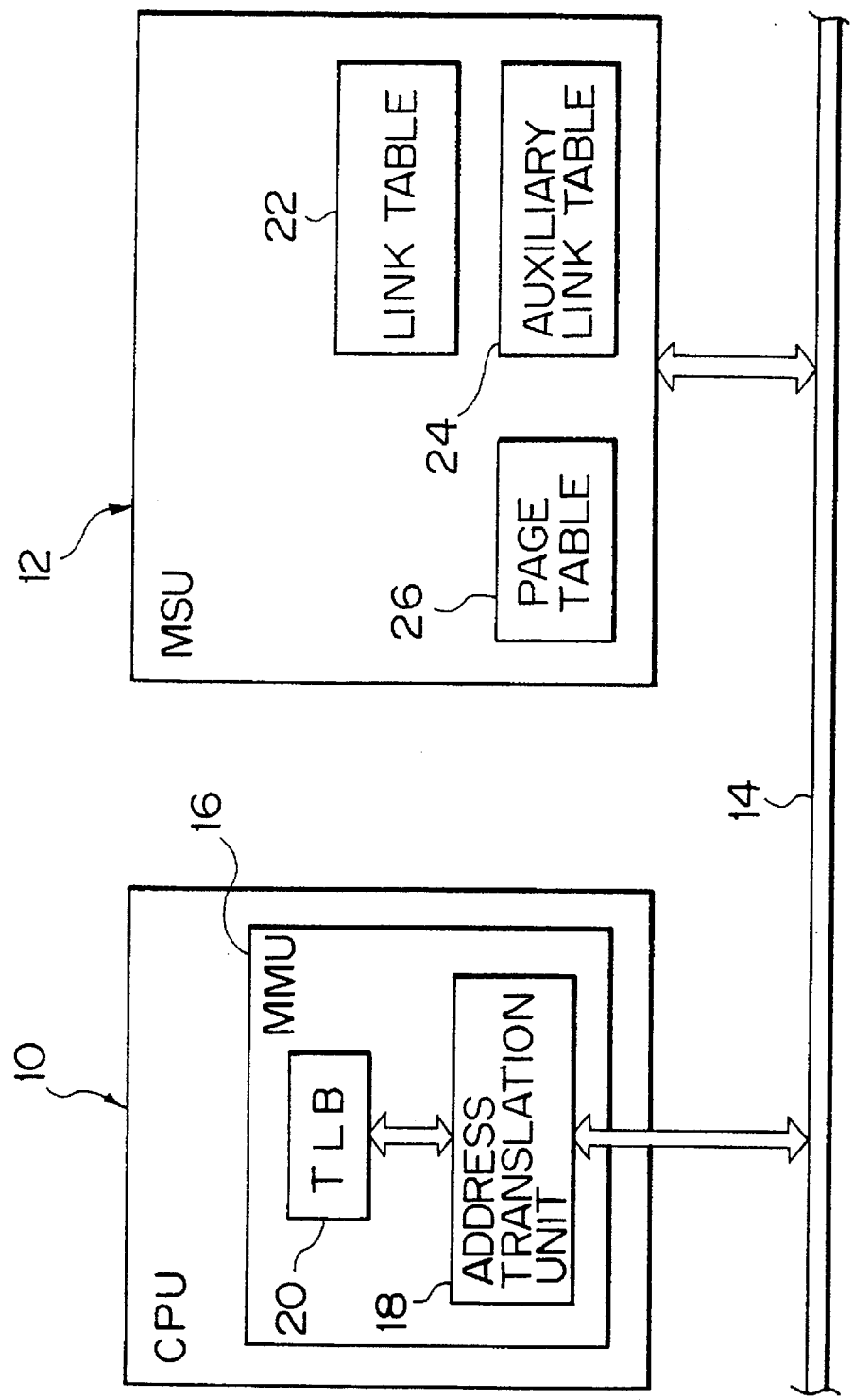

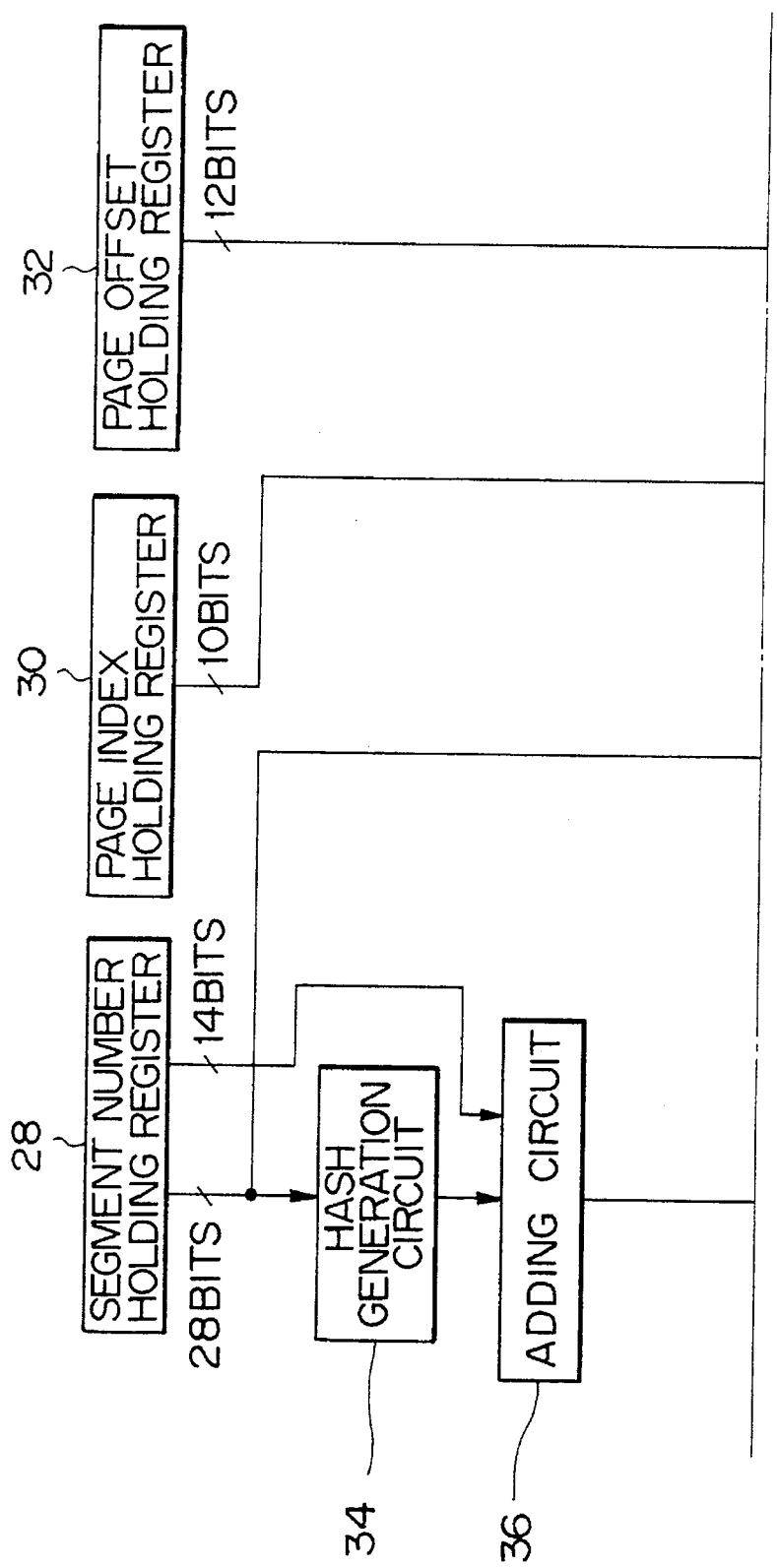

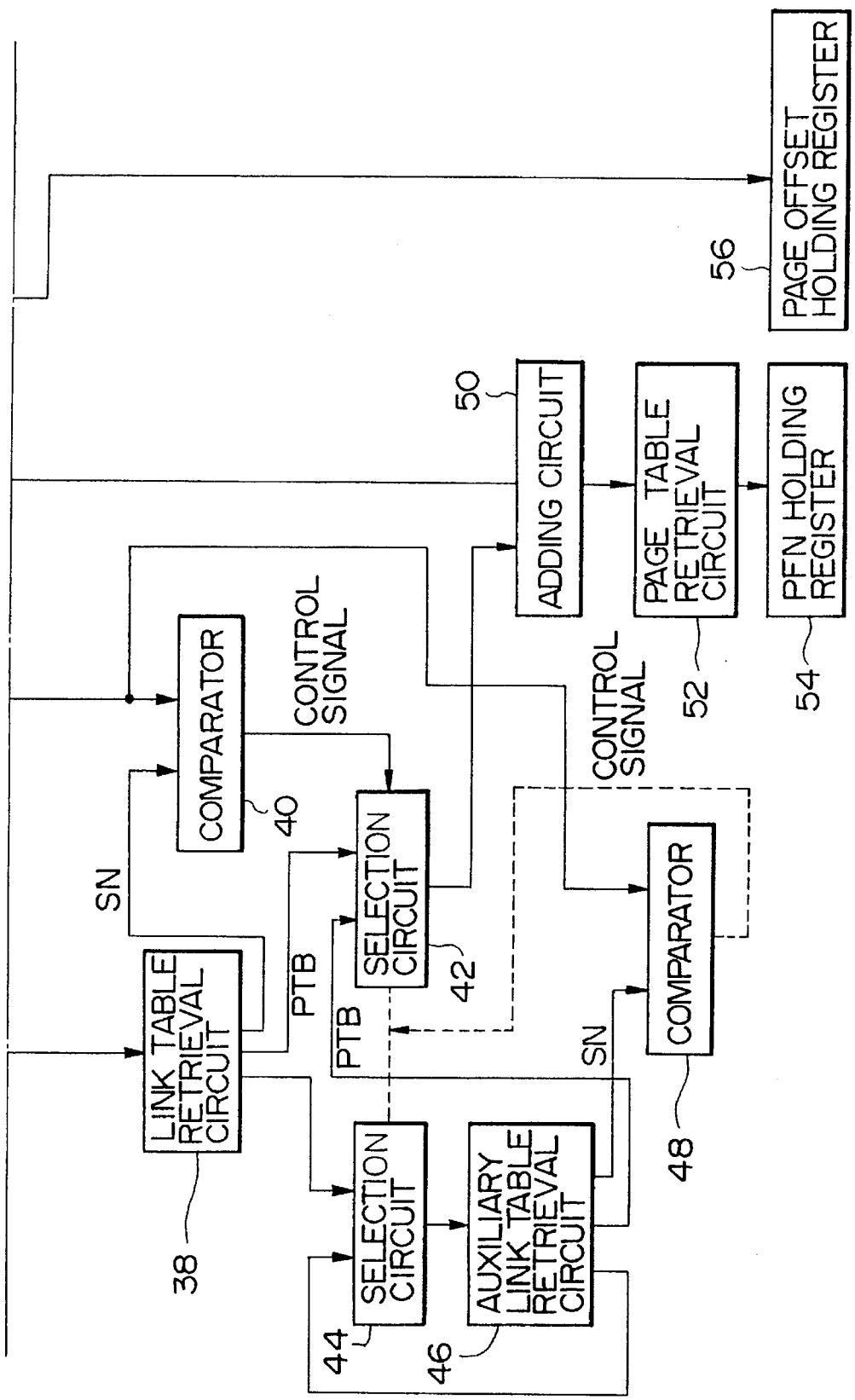

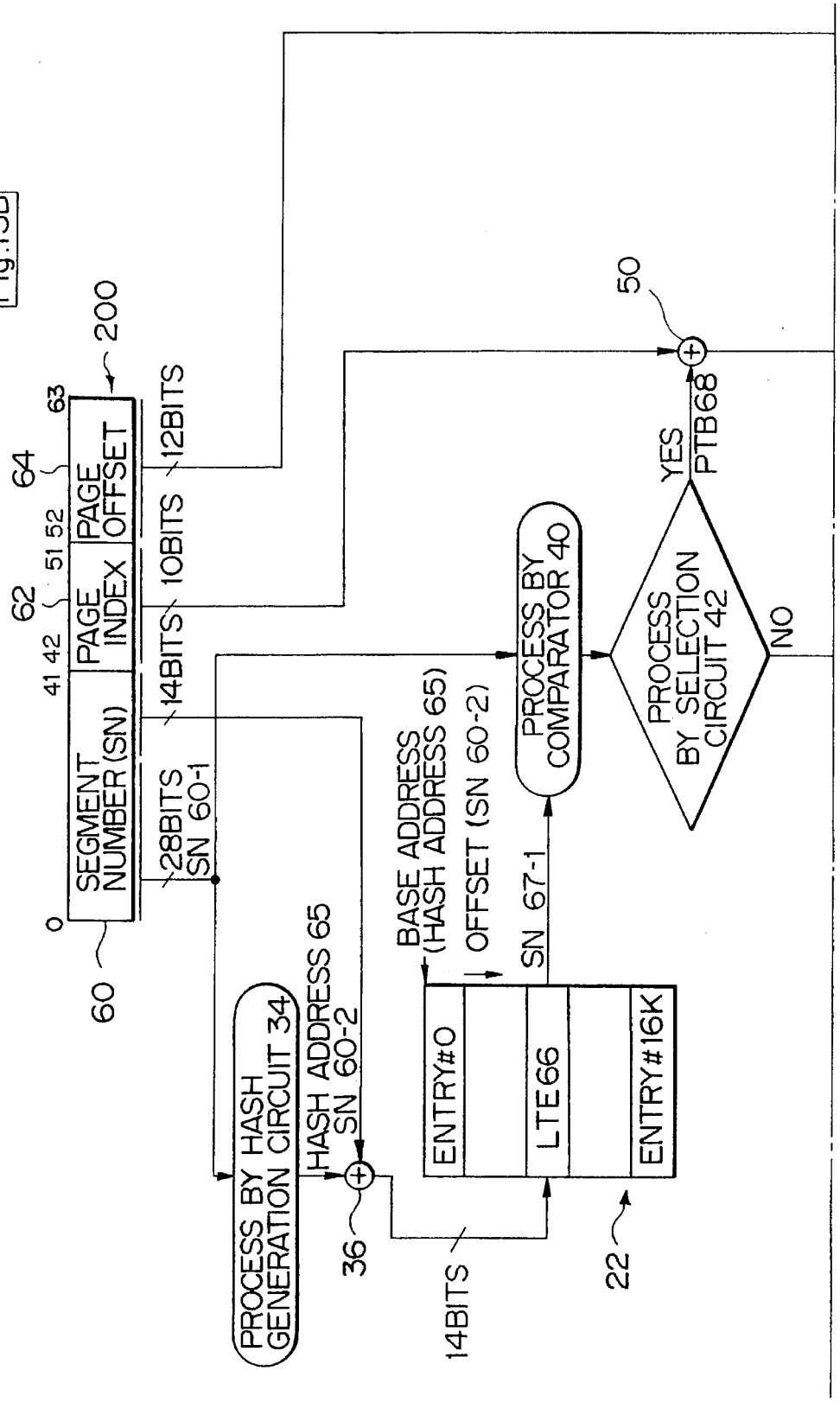

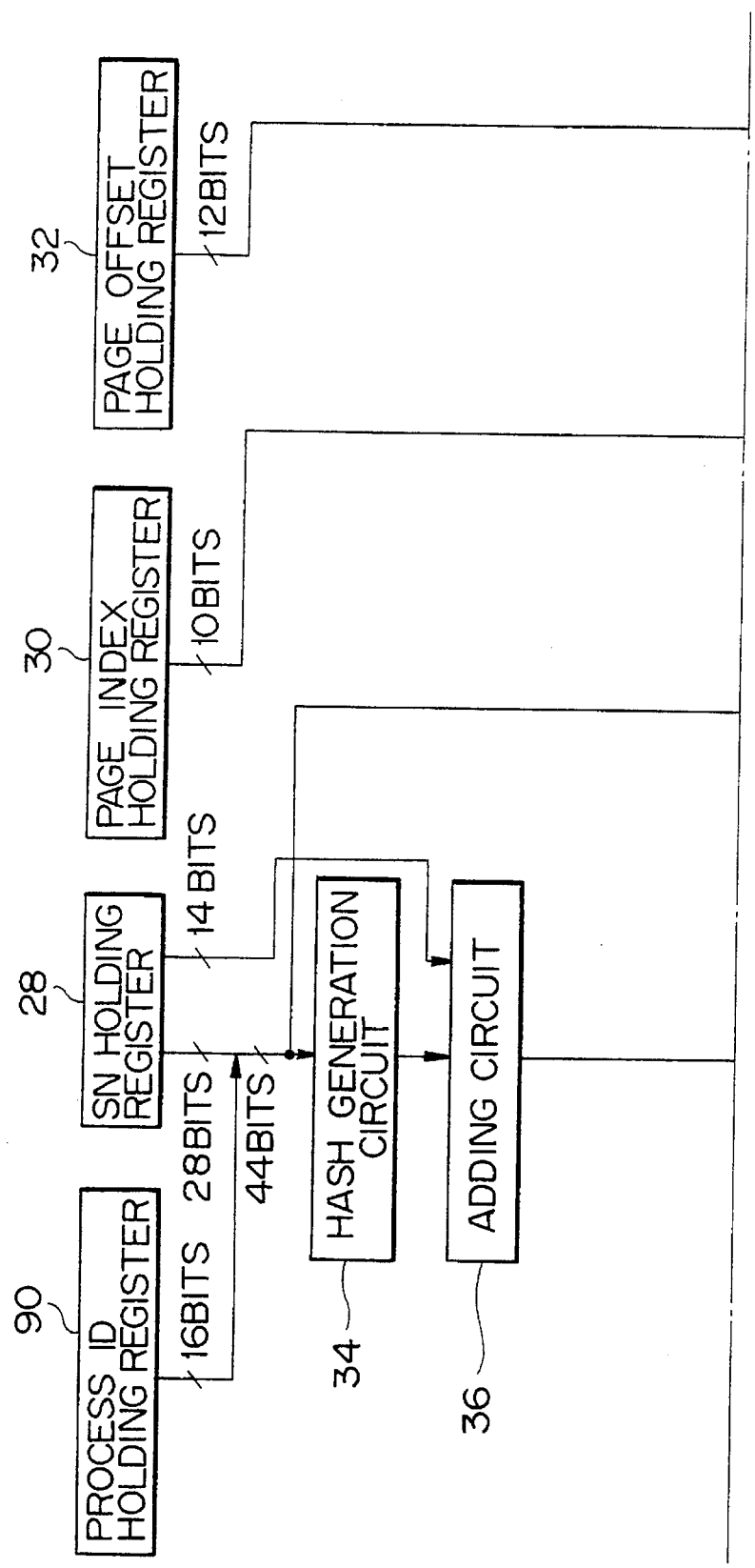

VIRTUAL MEMORY ADDRESS TRANSLATION APPARATUS AND METHOD USING LINK, AUXILIARY LINK AND PAGE TABLES

BACKGROUND OF THE INVENTION

1. Field of the Invention

The present invention relates to a method and apparatus for address translation for translating a virtual address in a virtual memory system into a real address. More specifically, the present invention relates to a method and apparatus for translating a 64-bit virtual address into a real address.

Recently, a 64-bit configuration of data and addresses has been required with the demand for a higher operation speed of computer systems. To satisfy this demand, several methods of translating 64-bit virtual addresses into real addresses have been proposed, but an address translation method capable of easily maintaining compatibility with a 32-bit virtual address and also capable of rapid translation, has not yet been realized. Accordingly, an address translation method of a 64-bit virtual address, which can satisfy both compatibility with the 32-bit virtual address and high speed address translation, has been required.

2. Description of the Related Art

To begin with, a virtual memory system using a conventional virtual address of up to 32 bits will be explained. In the case of a virtual memory system using a 32-bit virtual address, for example, the virtual address comprises a segment number 104, a page index 62 and a page offset 64, as shown in FIG. 1.

Here, the segment number 104 represents the position where the virtual space, which is a variable-length block as a constituent element of a program, is divided into segment units, and the page index 62 represents the position where the segment region is divided into page units. Further, the page offset 64 represents the position inside the page region corresponding to the real space.

To translate a virtual address into a real address, a two-stage translation method which obtains the real address by retrieving a segment table 108 and a page table 112 as shown in FIG. 2, has ordinarily been used.

In other words, a base address of the segment table 108 is obtained from a segment table base register 106, and retrieval is then carried out by adding a segment number 104 of the virtual address as an offset to this base address to obtain a base address (PTB) 110 of the page table 112. Next, a page index 62 inside the virtual address is added as the offset to the base address 110 obtained from the segment table 108 so as to retrieve the page table 112 to obtain a page frame number (PFN) 114. Finally, the real address can be obtained by combining the page frame number 114 obtained from the page table 112 with the page offset 64 in the virtual address.

FIG. 3 shows the relationship between the virtual space and the real space according to the address translation method shown in FIG. 2. The virtual space 115 is first divided into segments 116-1, 116-2, ..., and each segment is divided into pages 118-1 to 118-4 having a size corresponding to the real space 122, as typified by the segment 116-2.

An arbitrary address inside the virtual space 115 designated by 32 bits shown in FIG. 1, is translated into the real address by the two-stage translation using the segment table 108 and the page table 112, and represents a physical address in the real space 122 secured in a main storage unit (MSU).

Assuming hereby that the bit field of the virtual address is constituted by 10 bits for the segment number 104, 10 bits for the page index 62 and 12 bits for the page offset 64, the size of the page becomes 4 KB which is determined by the 12 bits of the page offset 64, and the segment table 108 and the page table 112 are respectively constituted by entry blocks of 1K determined by the 10 bits ($2^{10}$1K) of each of the segment number 104 and the page index 62 (refer to FIG. 2, entry #0 to entry #1K).

When such a conventional address translation method is applied to a virtual memory system using a virtual address exceeding 32 bits such as a 64-bit virtual address, for example, the bit construction becomes like the one shown in FIG. 4. In other words, it comprises 26 bits for the segment number 104, 26 bits for the page index 62 and 12 bits for the page offset 64 as shown in FIG. 4.

Here, the size of the page becomes 4KB determined by the 12-bit page offset 64, and the segment table 108 and the page table 112 are respectively constituted by entry blocks of 64M determined by 26 bits ($2^{26}$=64M) of each of the segment number 104 and the page index 62. Accordingly, the segment table and the page table become very large and the area they occupy in the real address space secured in the main storage unit becomes great. In other words, the real address space that can be practically used as the memory system becomes small.

One 64-bit address translation method for coping with such a problem is shown in FIG. 5. According to the address translation method shown in FIG. 5, the virtual address is divided into virtual address bits 124 and page offset bits 126. The virtual address bits 124 are translated into a hash address 130 by a hash generation circuit (Hash Gen.) 128, and a hash anchor table 132 is retrieved by this hash address 130.

A page frame table pointer (PFT) 134 is obtained from the hash anchor table 132, and when the page frame table 135 is retrieved by this pointer 134, a page frame table entry 136 can be obtained. This frame table entry (PFTE) 136 contains the virtual address, a page frame number and a link address.

Next, the virtual address bits 124 in the virtual address are compared with the virtual address inside the page frame entry table (PFTE) 136 and when they coincide with each other, the real address 26 can be obtained as the combination of the page frame number 142 with the page offset bits 126 in the virtual address. If they do not coincide, the next page frame table entry (PFTE) is obtained using the link address and a similar procedure is repeated until the coincident address can be found.

The virtual address bits 124 don't conform to the virtual address bits inside the page frame table entry (PFTE) 136, when the same hash addresses are generated even in the case where the virtual address bits are different from each other in the hash generation circuit 128. In this case, the virtual address bits 124 are stored in the page frame table entry (PFTE) corresponding to the link address generated in accordance with a predetermined rule.

FIG. 6 is an explanatory view showing the relationship between the virtual space and the real space in the address translation method shown in FIG. 5. In this case, the virtual space 146 is divided into pages 148-1, 148-2, ... having a size corresponding to the real space 152.

An arbitrary virtual address inside this virtual space 146 is translated into the real address using the hash generation circuit 128, the hash anchor table 132 and the page frame table 135, and represents a physical address in the real space 152 secured in the main storage unit (MSU).

However, the conventional address translation method shown in FIG. 5 is devoid of the concept of "segment" which is higher by one stage than the page, as shown in the virtual space 146 in FIG. 6, and is greatly different from the virtual space 115 of the conventional 32-bit virtual address having the concept of segment for effecting two-stage table translation shown in FIG. 3. Here, the problem how to maintain compatibility arises.

Further, two tables, that is, the hash anchor table and the page frame table in the main storage unit, are retrieved before the comparison of the virtual addresses. This means that access to the main storage unit must be made twice, and another problem occurs in that a long time is necessary to confirm whether or not the address translation is correct.

SUMMARY OF THE INVENTION

In view of the problems described above, an object of the present invention is to provide a method and apparatus of address translation for use in a virtual memory system using a virtual address of at least 32 bits, such as a 64-bit virtual address, which can effect address translation at a higher speed while maintaining compatibility with a virtual address of below 32 bits, by introducing the concept of segments into a virtual space.

To accomplish the object described above, a method of address translation according to the present invention includes a virtual address holding step of holding, as a translation object, a virtual address comprising a segment number, a page index and a page offset and having bits exceeding 32 bits, in such a manner as to correspond to a structure wherein a virtual space is divided into segment units and each segment region is divided into page units corresponding to a real space; a hash processing step of inputting a part of the virtual address into a hash generation circuit and generating a hash address to serve as a base address of a link table; a link table retrieving step of adding a part of the virtual address as an offset to the hash address, retrieving the link table to thereby obtain tag information of the virtual address, a base address of a page table and a link pointer used for retrieving an auxiliary link table, comparing the tag information of the virtual address with a part of the virtual address, and outputting the base address of the page table as being a correct base address when the result of comparison proves coincident; an auxiliary link table retrieving step of retrieving the auxiliary link table by the link pointer when the tag information of the virtual address obtained in the link table retrieving step does not coincide with the part of the virtual address to thereby obtain tag information of a next virtual address, the base address of the next page table and the next link pointer, and continuing retrieval of the auxiliary link table on the basis of the link pointer until a correct base address of the page table can be obtained; a page table retrieving step of adding, as an offset, a part of the virtual address to the base address of the page table obtained in the link table retrieving step or in the auxiliary link table retrieving step so as to retrieve the page table, and obtaining a page frame number; and a real address generating step of combining a part of the virtual address as an offset with the page frame number obtained in the page table retrieving step, and generating a real address.

Preferably, in the address translation method described above according to the present invention, the virtual address is a 64-bit virtual address, and compatibility with a virtual memory system using a 32-bit virtual address is maintained by constituting the page index and the page offset of the 64-bit virtual address with the same construction as those of the 32-bit virtual address.

Further preferably, in the address translation method of the present invention, the hash processing step generates the hash address by inputting a predetermined number of bits of high order bits of the segment number of the virtual address held by the virtual address holding step.

Further preferably, in the address translation method of the present invention, the link table retrieving step retrieves the link table by adding a predetermined number of bits of lower order bits of the segment number as an offset to the hash address, and judges whether or not the base address of the page table is correct by comparing the tag information of the virtual address obtained from the link table with a predetermined number of high order bits of the segment number.

On the other hand, an address translation apparatus according to the present invention includes virtual address holding means for holding, as a translation object, a virtual address comprising a segment number, a page index and a page offset and having bits exceeding 32 bits, in such a manner as to correspond to a structure wherein a virtual space is divided into segment units and each segment region is divided into page units corresponding to a real space; hash generation means for inputting a part of the virtual address into a hash generation circuit and generating a hash address to serve as a base address of a link table; link table retrieving means for adding a part of the virtual address as an offset to the hash address, retrieving the link table to thereby obtain tag information of the virtual address, a base address of a page table and a link pointer used for retrieving an auxiliary link table, comparing the tag information of the virtual address with a part of the virtual address, and outputting the base address of the page table as being a correct base address when the result of comparison proves coincident; auxiliary link table retrieving means for retrieving the auxiliary link table by the link pointer when the tag information of the virtual address obtained by the link table retrieving means does not coincide with the part of the virtual address to thereby obtain tag information of a next virtual address, the base address of the next page table and the next link pointer, and continuing retrieval of the auxiliary link table on the basis of the link pointer until a correct base address of the page table can be obtained; page table retrieving means for adding, as an offset, a part of the virtual address to the base address of the page table obtained by the link table retrieving means or by the auxiliary link table retrieving means so as to retrieve the page table, and obtaining a page frame number; and real address generation means for combining a part of the virtual address as an offset with the page frame number obtained by the page table retrieving means, and generating a real address.

Preferably, in the address translation apparatus according to the present invention, the virtual address is a 64-bit virtual address, and compatibility with a virtual memory system using a 32-bit virtual address is maintained by constituting the page index and the page offset of the 64-bit virtual address with the same construction as those of the 32-bit virtual address.

Further preferably, in the address translation apparatus of the present invention, the hash generating means generates the hash address by inputting a predetermined number of high order bits of the segment number of the virtual address held by the virtual address holding means.

Further preferably, in the address translation apparatus of the present invention, the link table retrieving means retrieves the link table by adding a predetermined number of lower order bits of the segment number as an offset to the hash address, and judges whether or not the base address of the page table is correct by comparing the tag information of the virtual address obtained from the link table with a predetermined number of high order bits of the segment number.

In a preferred embodiment of the present invention, an address translation method includes a process ID holding step of holing an ID number of process for which address translation is executed; a virtual address holding step of holding, as a translation object, a virtual address comprising a segment number, a page index and a page offset and having bits exceeding 32 bits, in such a manner as to correspond to a structure wherein a virtual space is divided into segment units and each segment region is divided into page units corresponding to a real space; a hash processing step of inputting the process ID and a part of the virtual address into a hash generation circuit and generating a hash address to serve as a base address of a link table; a link table retrieving step of adding a part of the virtual address as an offset to the hash address, retrieving the link table to thereby obtain the process ID, tag information of the virtual address, a base address of a page table and a link pointer used for retrieving an auxiliary link table, comparing the process ID obtained by the table retrieval with the process ID held by the process ID holding step and the tag information of the virtual address obtained by the table retrieval with a part of the virtual address held, and outputting the base address of the page table as being a correct base address when the results of the respective comparisons prove coincident; an auxiliary link table retrieving step of retrieving the auxiliary link table by the link pointer when at least one of the tag information and the process ID obtained in the link table retrieving step does not coincide, to thereby obtain a next process ID, tag information of a next virtual address, a base address of a next page table and a next link pointer, and continuing retrieval of the auxiliary link table on the basis of the link pointer until a correct base address of the page table can be obtained; a page table retrieving step of adding, as an offset, a part of the virtual address to the base address of the page table obtained in the auxiliary link table retrieving step or in the link table retrieving step so as to retrieve the page table, and obtaining a page frame number; and a real address generating step of combining a part of the virtual address as an offset with the page frame number obtained in the page table retrieving step, and generating a real address.

In another preferred embodiment of the present invention, an address translation apparatus includes process ID holding means for holding an ID number of a process for which address translation is executed; virtual address holding means for holding, as a translation object, a virtual address comprising a segment number, a page index and a page offset and having bits exceeding 32 bits, in such a manner as to correspond to a structure wherein a virtual space is divided into segment units and each segment region is divided into page units corresponding to a real space; hash generation means for inputting the process ID and a part of the virtual address into a hash generation circuit and generating a hash address to serve as a base address of a link table; link table retrieving means for adding a part of the virtual address as an offset to the hash address, and retrieving the link table to thereby obtain the process ID, tag information of the virtual address, a base address of a page table and a link pointer used for retrieving an auxiliary link table, comparing the process ID obtained by the table retrieval with the process ID held by the process ID holding means and the tag information of the virtual address obtained by the table retrieval with a part of the virtual address held, and outputting the base address of the page table as being a correct base address when the results of the respective comparisons prove coincident; an auxiliary link table retrieving means for retrieving the auxiliary link table by the link pointer when at least one of the tag information and the process ID obtained by the link table retrieving means does not coincide, to thereby obtain a next process ID, tag information of a next virtual address, a base address of a next page table and a next link pointer, and continuing retrieval of the auxiliary link table on the basis of the link pointer until a correct base address of the page table can be obtained; page table retrieving means for adding, as an offset, a part of the virtual address to the base address of the page table obtained by the link table retrieving means or by the auxiliary link table retrieving means so as to retrieve the page table, and obtaining a page frame number; and real address generation means for combining a part of the virtual address as an offset with the page frame number obtained by the page table retrieving means, and generating a real address.

Since the address translation method and apparatus of the present invention having the construction described above employs a virtual address exceeding 32 bits using the same bit construction as that of conventional virtual addresses of below 32 bits, it can introduce the concept of the segment. Further, the present invention can easily maintain compatibility with the virtual memory system using the conventional 32-bit virtual address.

Further, one table is retrieved on the basis of the hash address and immediately thereafter, address comparison is carried out to judge whether or not the base address obtained from the table is correct. Therefore, address translation can be done at a higher speed than the conventional address translation using the hash address where address comparison is carried out after two tables are retrieved.

BRIEF DESCRIPTION OF THE DRAWINGS

The above object and features of the present invention will be more apparent from the following description of preferred embodiments with reference to the accompanying drawings, wherein:

FIGS. 7A and 7B are block diagrams showing an embodiment based on the principle of the present invention;

FIG. 8 is a block diagram showing a hardware configuration of a computer for which the present invention is employed;

FIGS. 9A and 9B are block diagrams showing the hardware configuration of the address translation mechanism according to the first preferred embodiment of the present invention;

FIGS. 13A and 13B are block diagrams showing the address translation function according to the first embodiment shown in FIGS. 9A and 9B;

FIGS. 14A and 14B are block diagrams showing the hardware configuration of the address translation mechanism according to the second preferred embodiment of the present invention;

DESCRIPTION OF THE PREFERRED EMBODIMENTS

Figure 1:
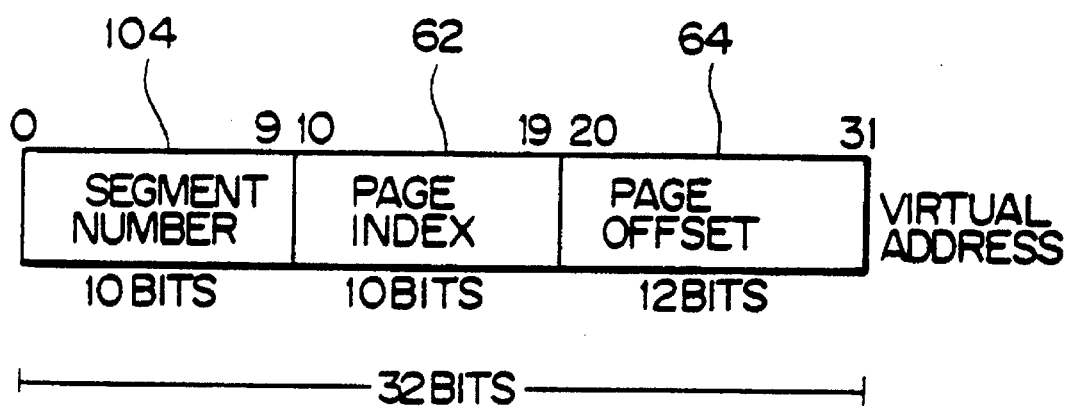
FIG. 1 is a conceptual explanatory view useful for explaining a bit format of a conventional 32-bit virtual address employing the concept of segments.
Figure 2:
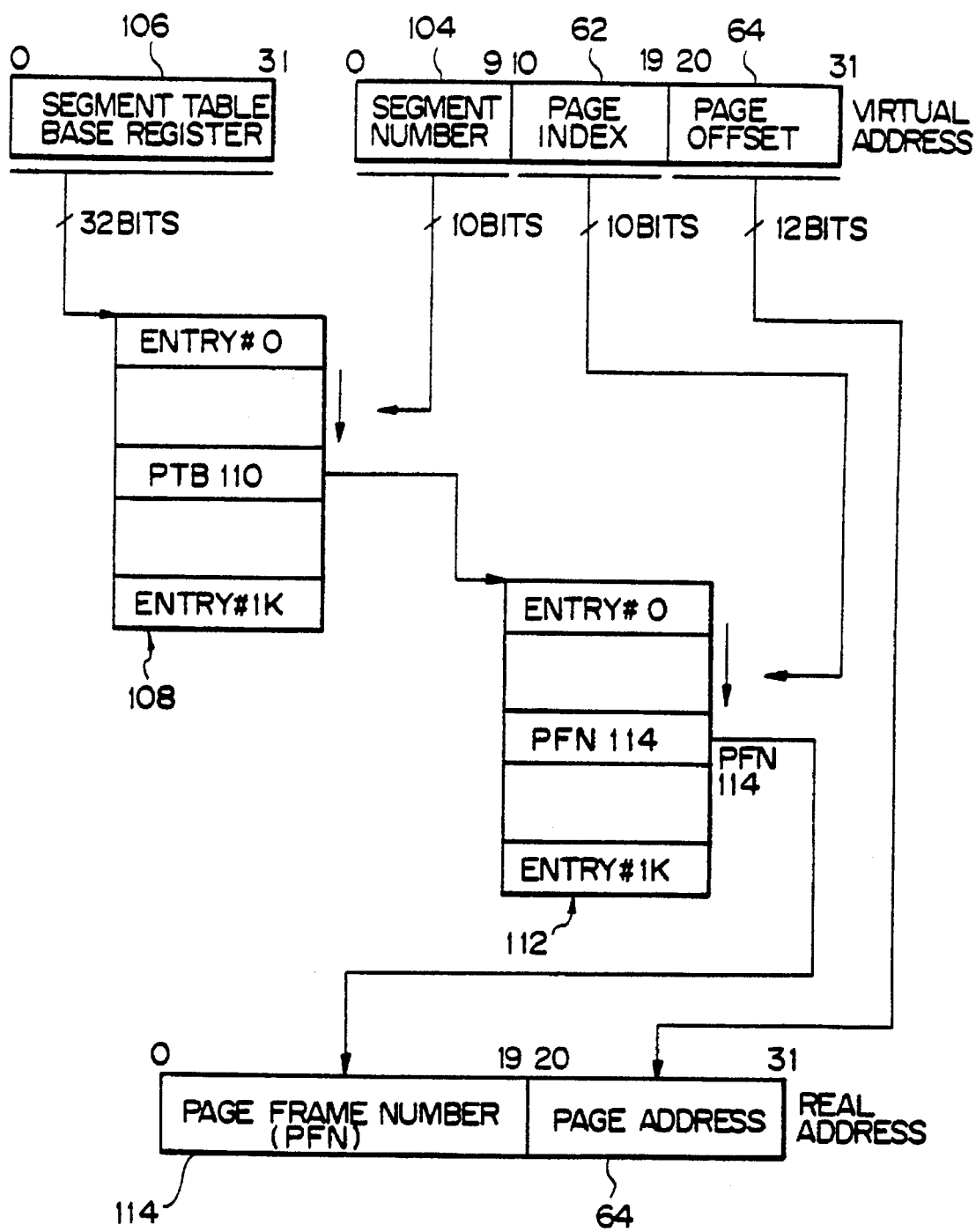
FIG. 2 is a block diagram showing the translation function of a conventional address translation mechanism.
Figure 3:
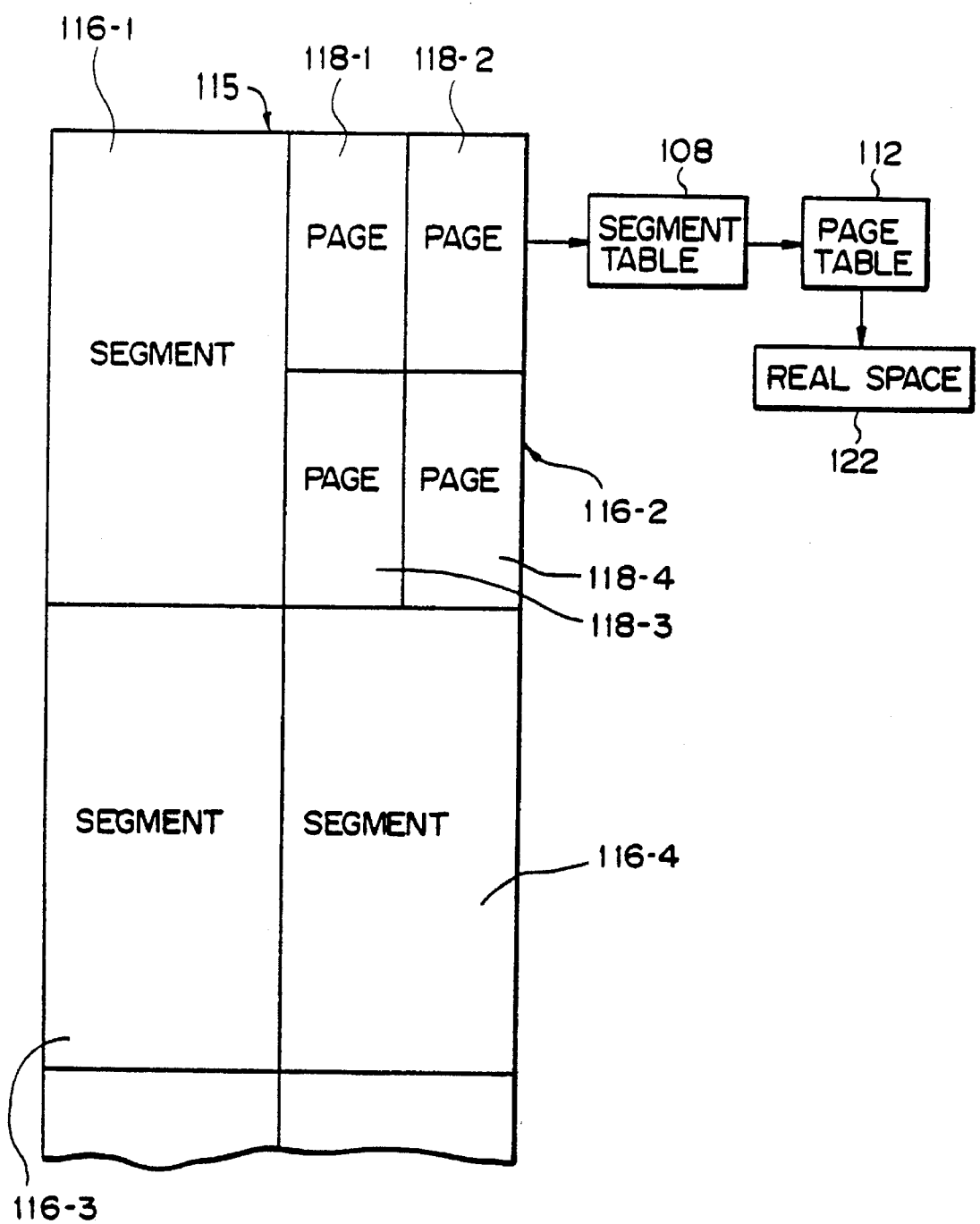
FIG. 3 is a block diagram showing the relationship between a virtual space and a real space in address translation shown in FIG. 2.
Figure 4:
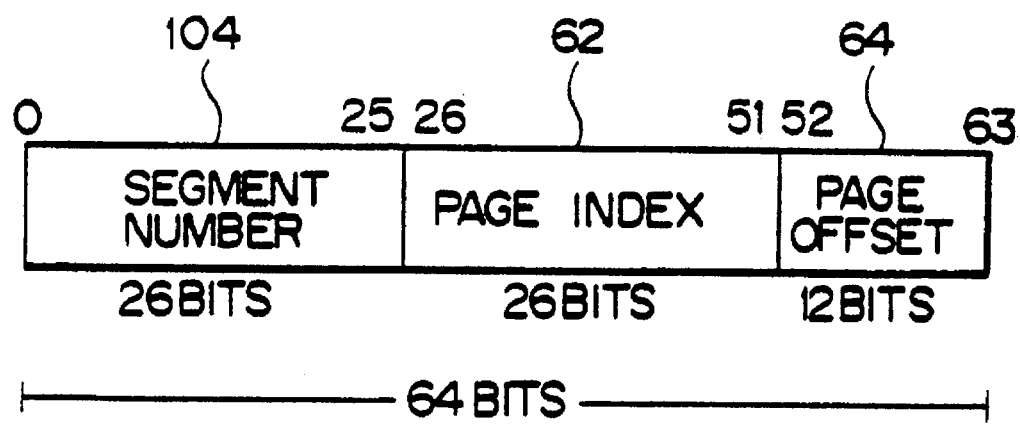
FIG. 4 is a conceptual explanatory view useful for explaining the bit format when the 32-bit virtual address shown in FIG. 1 is expanded to 64 bits.
Figure 5:
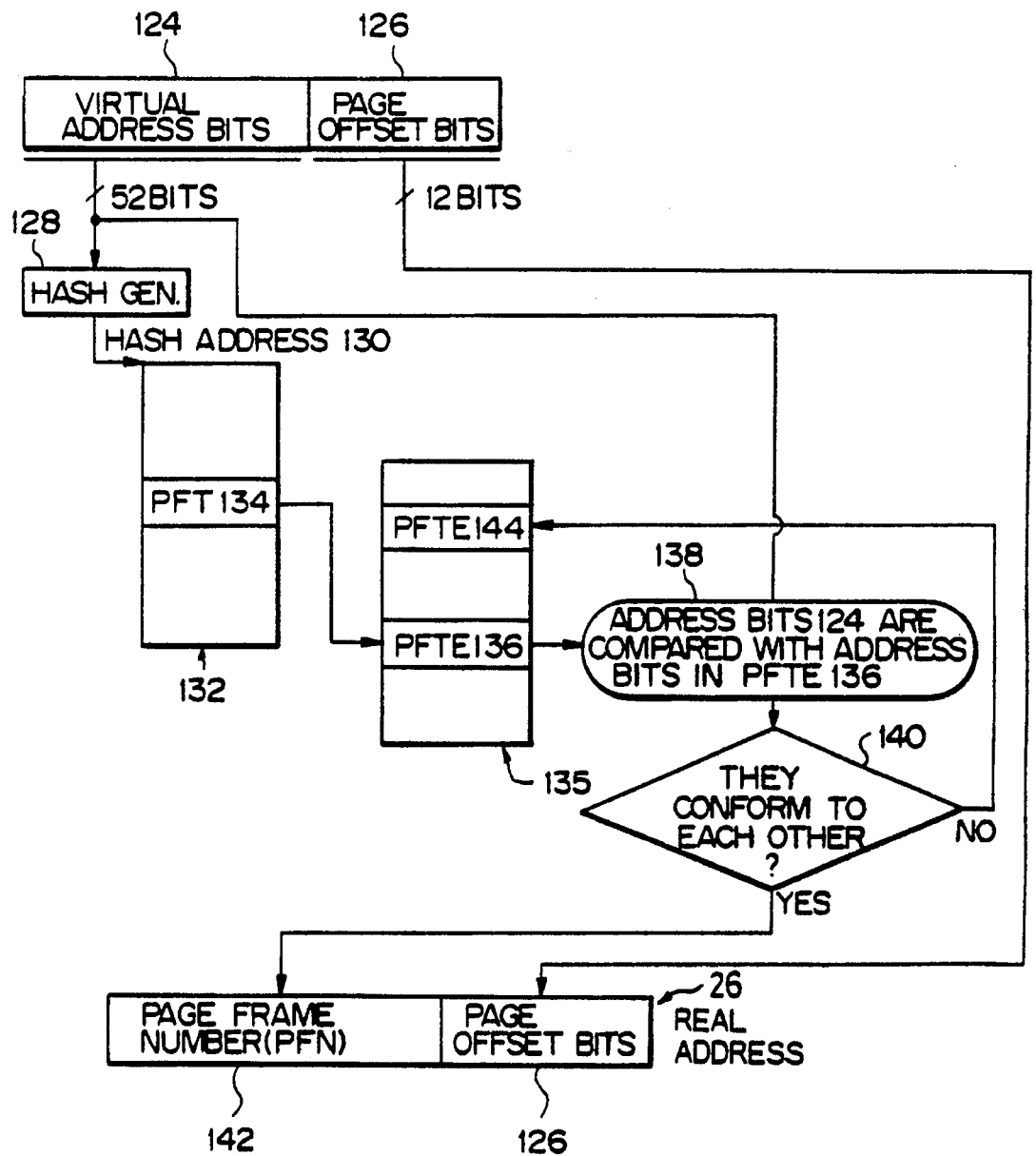
FIG. 5 is a block diagram showing a conventional address translation mechanism of a 64-bit virtual address not having the concept of segments.
Figure 6:
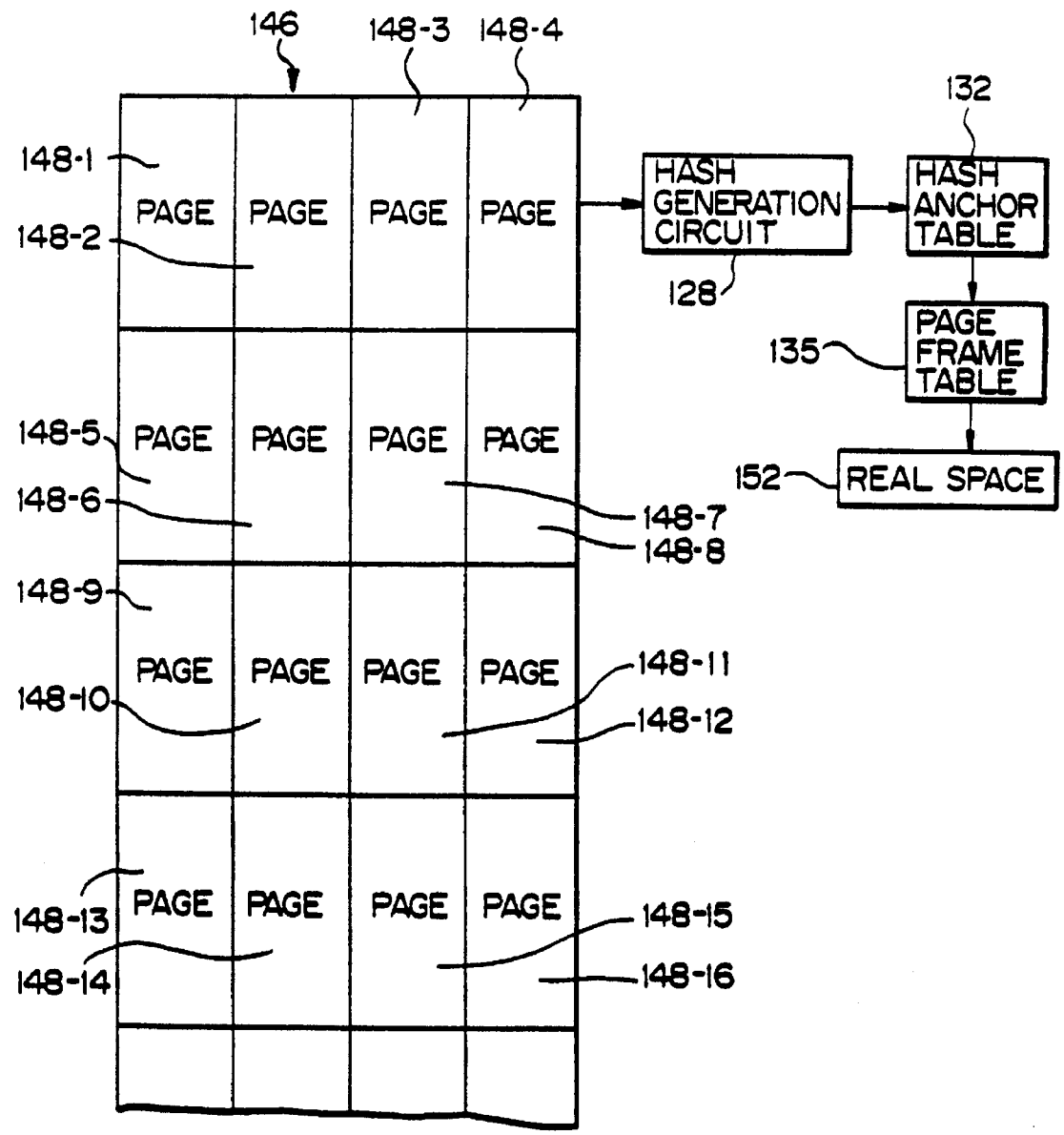
FIG. 6 is a block diagram showing the relationship between the virtual space and the real space in address translation in FIG. 5.

FIGS. 7A and 7B are block diagrams useful for explaining an embodiment based on the principle of the present invention. In this case, the embodiment of the present invention is illustrated in two drawings of FIGS. 7A and 7B.

A virtual address exceeding 32 bits as the translation object of the present invention, such as a 64-bit virtual address, comprises:

① segment number 60

② page index 62

③ page offset 64.

The address translation procedures are as follows. First of all, high order bits of the segment number (SN) 60 as a part of the virtual address are input to a hash generation circuit 34 so as to obtain a hash address as the base address of a link table 22. The link table 22 is retrieved by the table address obtained by adding, as an offset, the lower order bits of the segment number to this hash address, to obtain a link table entry containing tag information of the virtual address, the base address of a page table 26 and a pointer of an auxiliary link table 24.

Next, the tag information of the virtual address (the high order bits of the segment number) inside the link table entry (LTE) obtained from the link table 22 is compared with a part (high order bits) of the original segment number 60, and the base address of the page table 26 inside the link table entry is found to be correct if thy coincide with each other.

Here, if they do not coincide, the auxiliary link table 24 is retrieved by a link pointer inside the link table entry to obtain an auxiliary link table entry containing the tag information of the virtual address, the base address of the page table 26 and the pointer of the auxiliary link table 24. This auxiliary link table entry (ALTE) has exactly the same construction as the link table entry (LTE) obtained from the link table 22, and the auxiliary link table 24 is retrieved until the tag information of the virtual address, which coincides with the original segment number 60, is found and the correct base address of the page table 26 can be obtained.

When the base address of the page table 26 can be obtained from the link table 22 or from the auxiliary link table 24, the page table 26 is retrieved by the table address obtained by adding the page index 62 of the virtual address to the base address as offset, to obtain a page table entry. This page table entry (PTE) contains a page frame number, and the sum of the page offset 64 of the virtual address and this page frame number (PFN) eventually becomes a real address.

In the method and apparatus of address translation according to the present invention, which is directed to a virtual memory system having a virtual space for each process, a process ID and a part (high order bits) of the segment number 60 are input by the hash generation circuit 34 to obtain a hash address as the base address of the link table 22.

The link table entry (LTE) obtained from the link table 22 contains the process ID, and the base address of the page table 26 of the link table entry (LTE) can be found to be correct when this process ID coincides with the original process ID in addition to the coincidence between the tag information of the virtual address and the original segment information. This also holds true of the retrieval of the auxiliary link table 24.

Here, the virtual address is a 64-bit virtual address, and its compatibility with the existing 32-bit virtual address can be established by constituting the page index 62 and the page offset 64 of this 64-bit virtual address in the same way as those of the 32-bit virtual address.

Further, processing using the auxiliary link table is accomplished by software, and in this way, hardware of the address translation mechanism may be reduced.

The address translation method and apparatus of this embodiment having the construction described above employs the virtual address exceeding 32 bits by the bit configuration in the same way as the conventional addresses below 32 bits. Accordingly, the concept of segments can be introduced. Further, in the embodiment described above, compatibility with the conventional virtual memory system using the 32-bit virtual address can be easily established.

Address comparison is made immediately after one table is retrieved and one entry block in the table is selected on the basis of the hash address to judge whether or not the base address of the lower order table obtained from the table is correct. Accordingly, in comparison with address translation according to the prior art wherein address comparison is made after retrieval of the two tables, address translation can be accomplished at a higher speed.

FIG. 8 is an explanatory view showing the hardware configuration of a computer to which address translation according to the present invention is applied.

In FIG. 8, reference numeral 10 denotes a central processing unit (CPU), which includes a memory management unit (MMU) 16. An address translation unit 18 for effecting address translation according to the present invention and a translation index buffer (TLB) 20 are provided inside the memory management unit 16.

Reference numeral 12 denotes a main storage unit (MSU), which is connected to the central processing unit 10 through an internal bus 14. The main storage unit 12 stores therein a link table 22, an auxiliary link table 24 and a page table 26 used for the address translation unit 18. Needless to say, a memory region used as a real memory space is provided inside the main storage unit 12, and a corresponding memory region is swapped, whenever necessary, from an external storage unit such as a magnetic disk corresponding to a virtual space.

FIGS. 9A and 9B are structural block diagrams showing the first preferred embodiment of the hardware configuration of the address translation mechanism disposed in the central processing unit 10 shown in FIG. 8. In this embodiment, address translation of a 64-bit virtual address is taken as an example. In this case, the first preferred embodiment is illustrated in two drawings of FIGS. 9A and 9B.

Figure 10:
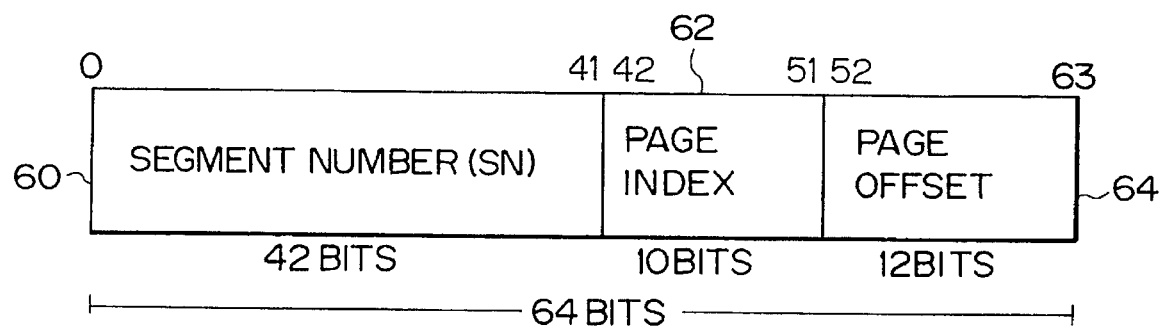
FIG. 10 is a conceptual explanatory view useful for explaining the bit format of a 64-bit virtual address according to the present invention.

In FIG. 9A, the 64-bit virtual address as the object of translation is held by a segment number holding register 28, a page index holding register 30 and a page offset holding register 32. In other words, the virtual address as the translation object in the embodiment shown in FIG. 9A comprises a 42-bit segment number 60, a 10-bit page index 62 and a 12-bit page offset 64 as shown in a bit format of FIG. 10.

Here, the page index 62 and the page offset 64 have the same bit format as that of the conventional 32-bit virtual address shown in FIG. 1, and only the segment number 60 is expanded to 42 bits.

Referring again to FIG. 9A, a hash generation circuit 34 is disposed after the segment number holding register 28. The hash generation circuit 34 inputs a part of the segment number of the virtual address, i.e., high order 28 bits in this embodiment, in the 42-bit segment number 60, as a hash parameter, and generates a hash address. An adding circuit 36 is disposed after the hash generation circuit 34, and adds the hash address obtained from the hash generation circuit 34 to the lower order 14 bits of the segment number holding register 28.

The hash address generated by the hash generation circuit 34 becomes a base address of the link table 22 shown with reference to the main storage unit 12 shown in FIG. 8, which is to be retrieved by a next link table retrieval circuit 38. The lower order 14 bits of the segment number 60, which are to be added by the adding circuit 36 to the hash address, becomes an offset of the link table 22 for the base address.

In FIG. 9B, the link table retrieval circuit 38 retrieves the link table 22 stored in the main storage unit 12 by the table address obtained from the addition circuit 36 and obtains a link table entry. The link table entry obtained by the retrieving the link table 22 by the link table retrieval circuit 38 contains the information shown in FIG. 11 that will be described below.

Figure 11:
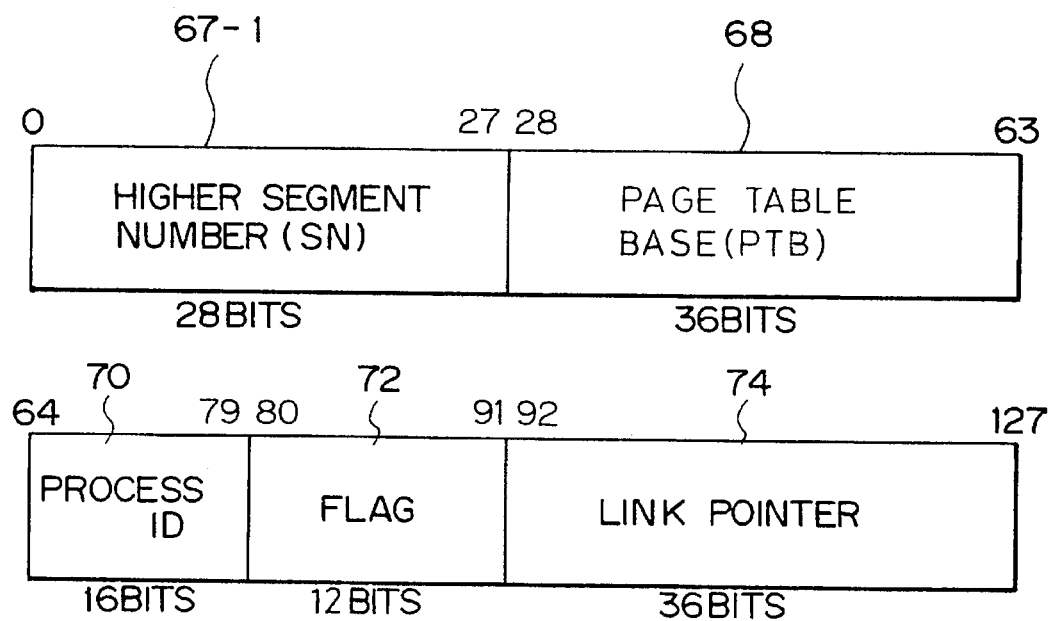
FIG. 11 is a conceptual explanatory view useful for explaining the content of link table entry (LTE) shown in FIGS. 13A and 13B.

In FIG. 11, the link table entry obtained from the link table 22 comprises a 128-bit bit format. In other words, it comprises a 28-bit high order segment number 67-1, a 36-bit page table base 68, a 16-bit process ID, a 12-bit flag 72 and a 36-bit link pointer 74.

Here, the high order segment number 67-1 represents the tag information of the virtual address to be translated, and stores information corresponding to the high order 28-bit segment number in the 42-bit segment number of the virtual address. The 12-bit flag is used in a region of a suitable control flag. Further, the link pointer 74 is used for retrieving the auxiliary link table 24. Incidentally, the process ID 70 is not used in the first embodiment shown in FIGS. 9A and 9B and is an empty region.

Referring again to FIGS. 9A and 9B, the high order segment number 67-1 in the link table entry, which is obtained from the link table 22 obtained from the link table retrieval circuit 38 and is shown in FIG. 11, is applied to the comparator 40 and is compared with the high order 28-bit segment number in the segment number holding register 28 When the coincidence output is obtained by the comparator 40, a control signal is outputted to a selection circuit 42 and at the same time, a page table base 68 in the link table entry at that time, which is obtained from the link table retrieval circuit 38 and is shown in FIG. 11, is output as a correct address to the adding circuit 50.

The adding circuit 50 adds the 10-bit page index held by the page index holding register 30 to the page table address obtained through the selecting circuit 42 to generate the table address, and retrieves the page table 26 of the main storage unit 12 shown in FIG. 8 by the page table retrieval circuit 52. When the page table 26 is retrieved, the page table entry shown in FIG. 12 can be obtained.

Figure 12:
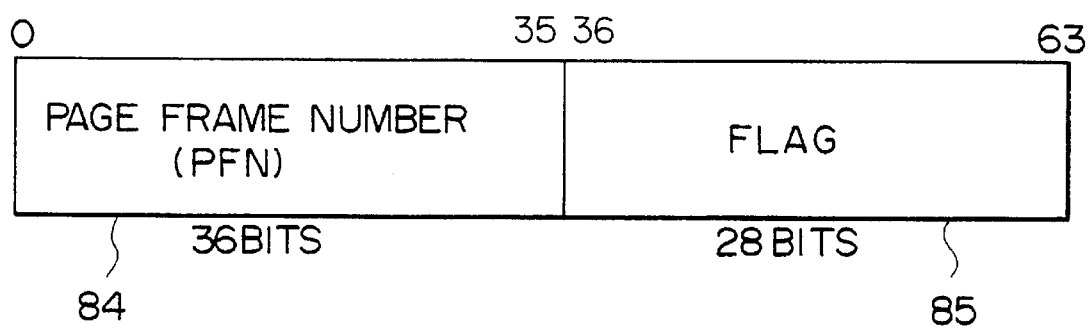
FIG. 12 is a conceptual explanatory view useful for explaining the content of a page table entry (PTE)

The page table entry shown in FIG. 12 comprises a 64-bit bit format, and a page frame number 84 is stored in the high order 36 bits and a flag 85 is stored in the lower order 28 bits.

Referring again to FIGS. 9A and 9B, the page frame number 84 obtained by retrieving the page table 26 by the page table retrieval circuit 52 and shown in FIG. 12 is held by the page frame number holding register 54. At the same time, page offset from the page offset holding register 32 is held by the page offset holding register 56, and a real address is generated by the contents held by the page frame number holding register 54 and the page offset holding register 56.

When the comparison result between the high order segment number obtained from the link table entry of the link table 22 and the high order segment number from the segment number holding register 28 by the comparator 40 is not coincident, the table retrieval of the auxiliary link table 24 disposed in the main storage unit 12 shown in FIG. 8 is effected by the selection circuit 44, the auxiliary link table retrieval circuit 46 and the comparator 48.

In other words, when the control signal corresponding to inequality is given to the selection circuit 44 by the comparator 40 through the selection circuit 42, the link pointer 74 in the link table entry obtained at that time by the link table retrieval circuit 38 and shown in FIG. 11 is selected, and the auxiliary link table entry is obtained by retrieving the auxiliary link table 24 of the main storage unit 12 by the auxiliary link table retrieval circuit 46.

The auxiliary link table entry obtained from the auxiliary link table 24 has exactly the same construction as that of the link table entry of the link table 22 shown in FIG. 11. Therefore, the comparator 48 compares the high order segment number as the tag information of the virtual address in the auxiliary link table entry obtained from the auxiliary link table 24 by the auxiliary link table retrieval circuit 46 with the high order segment number of the segment number holding register 28, and if they coincide with each other, the page table base is judged as being correct and is output to the adding circuit 50 through the selection circuit 42.

The retrieval processing of the auxiliary link table 24 by the auxiliary link table retrieval circuit 46 and the comparator 48 is effected repeatedly until the correct page table address is obtained. By the way, when "invalid" is detected by the retrieving operation of the auxiliary link table 24, it means that an error has occurred in address translation. Therefore, address translation is suspended. The adding circuits 36 and 50 shown in FIGS. 9A and 9B may be replaced by OR circuits.

Figure 13B:
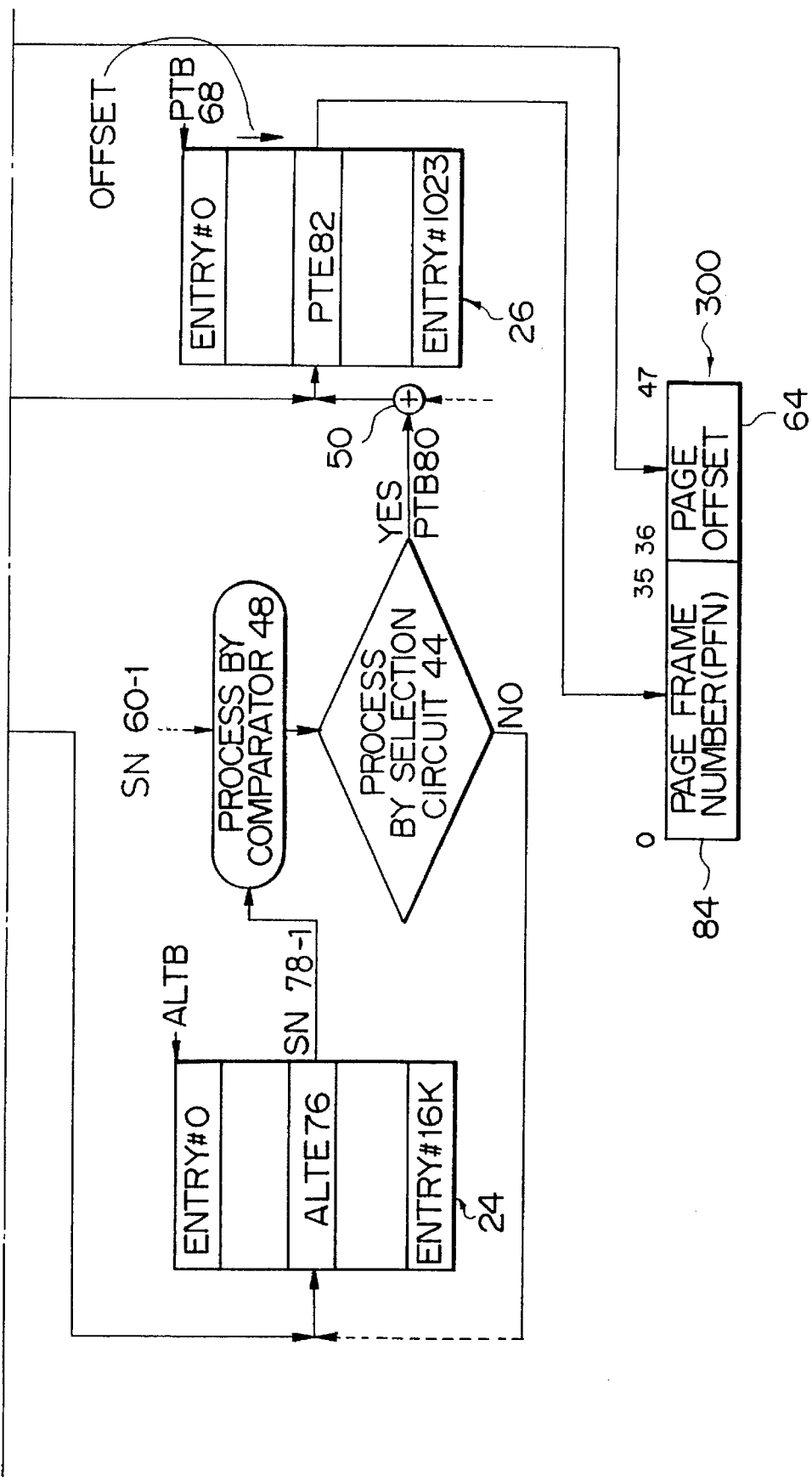

FIGS. 13A and 13B are explanatory views showing the translation function from the virtual address to the real address by the embodiment shown in FIGS. 9A and 9B.

In FIGS. 13A and 13B, the 64-bit virtual address 200 as the translation object is first held, and this virtual address 200 comprises the segment number 60, the page index 62 and the page offset 64.

In address translation, the high order segment number 60-1 of the high order 28 bits in the segment number 60 of the virtual address 200 is first input as a hash parameter into the hash generation circuit 34 so as to generate the hash address 65. This hash address 65 provides the base address of the link table 22. Next, the adding circuit 36 adds the lower order segment number 60-2 as the lower order 14 bits of the segment number 60 to generate the table address corresponding to the link table 22. The lower order segment number 60-2 to be added by the adding circuit 36 is the offset to the base address of the link table 22 which is determined by the hash address 65. Since the link table 22 hereby accepts the access by the 14-bit offset address, the number of entries is 16K, and the bit size of each entry is 128 bits.

The link table entry (LTE) 66 can be obtained by retrieving the link table 22 by the table address obtained by the adding circuit 36. As shown in FIG. 11, the link table entry 66 contains the high order segment number 67-1 as the tag information of the virtual address, the page table base 68 and the link pointer 74.

The high order segment number 67-1 in the link table entry 66 of the link table 22 is given to the comparator 40 and is compared with the high order segment number 60-1 in the virtual address 20. When coincidence is obtained by the comparator 48, the page table base 68 in the link table entry 66 is judged as being correct and output to the adding circuit 50, by means of a switching operation of the selection circuit 42.

When the result of comparison by the comparator 40 is unequal in the comparator 48, the auxiliary link table 24 is retrieved by the link pointer 74 in the link table entry 66 so as to determine the auxiliary link table entry 76 by retrieving the auxiliary link table 24 by the link pointer 74 in the link table entry 66, by means of a switching operation of the selection circuit 42. This auxiliary link table entry 76 has the same construction as that of the link table entry 66 of the link table 22 shown in FIG. 11, and the high order segment number 78-1 in it is compared with the high order segment number 60-1 in the virtual address 200 by the comparator 48.

When coincidence is obtained in the comparator 48 as a result of this comparison, the page table base address 80 in the auxiliary link table entry 76 is judged as being correct and is output to the adding circuit 50, by means of a switching operation of the selection circuit 44. When the result of comparison by the comparator 48 is not coincidence, the auxiliary link table 24 is again retrieved by using the link pointer in the auxiliary link table entry 76 so as to determine the next auxiliary link table entry. Retrieval of the auxiliary link table 24 is thus repeated until the result of comparison proves coincident in the comparator 48 and the correct page table base address 80 is obtained.

The adding circuit 50 adds the page index 62 in the virtual address 200 to the correct page table base 68 obtained from the link table entry of the link table 22 or to the correct page table base address 80 obtained from the auxiliary link table entry 76, and the table address of the page table 26 is generated. Incidentally, although in practice the adding circuit 50 is one circuit, it is divided into two parts for ease of explanation.

The page table 26 is retrieved by the table address obtained by the adding circuit 50 and provides the page table entry 82. This page table entry 82 contains the page frame number 84 as shown in FIG. 12. This page table number 84 is held at the high order portion of the 48-bit real address 300 and at the same time, the page offset 64 in the virtual address 200 is held by the lower order portion of the real address 300, thereby generating the real address 300.

Here, the table address from the adding circuit 50 has 10 bits in the same way as the page index 62. Therefore, the number of entries of the page table 26 is 1,024, and the bit size for each entry is 64 bits as shown in FIG. 12.

Figure 14B:
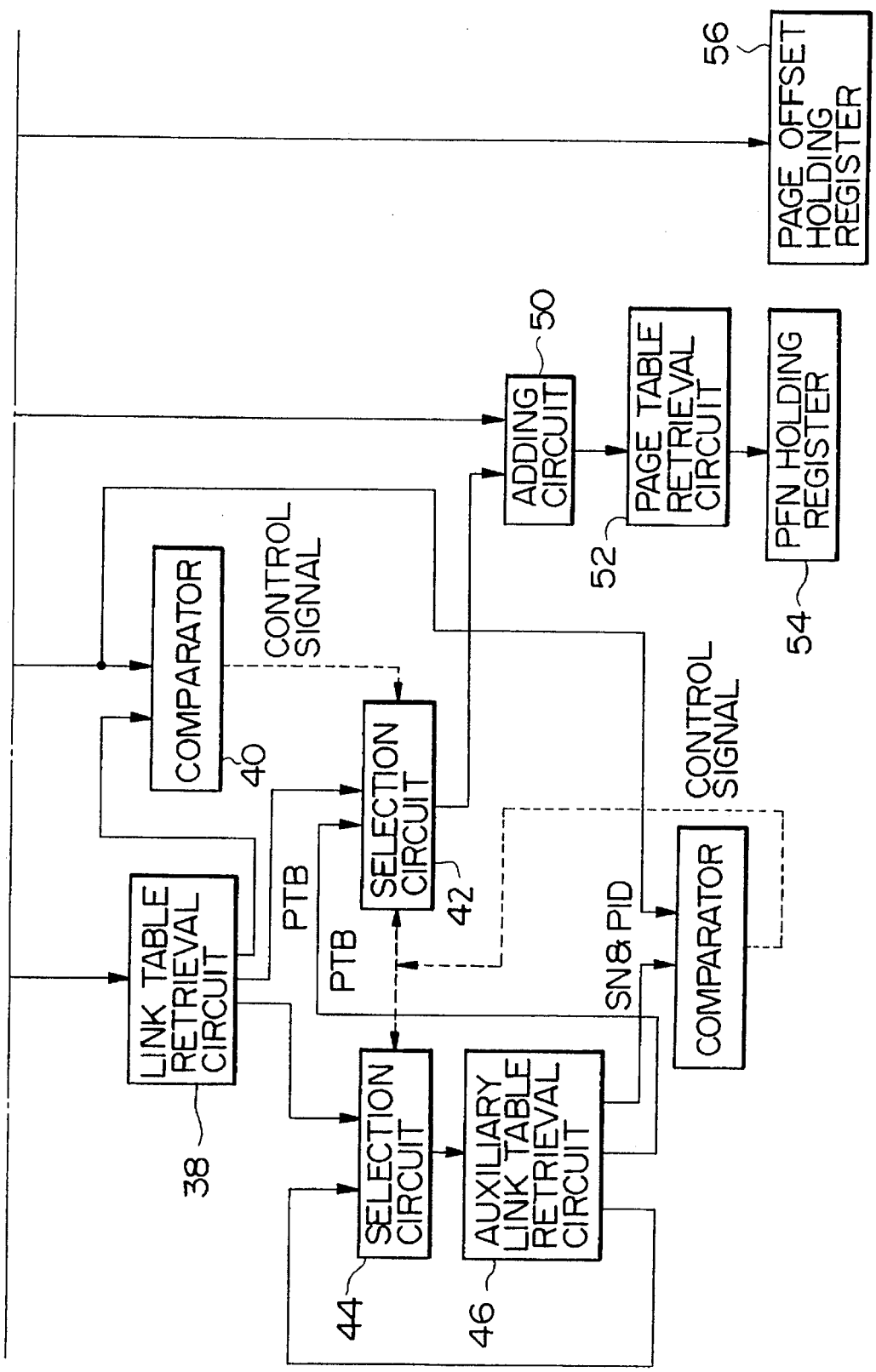

FIGS. 14A and 14B are structural block diagrams showing an embodiment of the hardware configuration of the address translation unit according to the second preferred embodiment of the present invention. In this embodiment, the virtual space and the real space are constituted for each process. Further, in this case, the second preferred embodiment is illustrated in two drawings of FIG. 14A and FIG. 14B.

In FIGS. 14A and 14B, the difference of this embodiment from the first embodiment resides in that a process ID holding register 90 for specifying a process is disposed afresh. Besides the high order segment number (28 bits) from the segment number holding register 28 as the hash parameter, the hash generation circuit 34 inputs the 16-bit process ID from the process ID holding register 90 and generates the hash address.

The process ID 70 shown in FIG. 11 is stored as the effective data in the link table entry obtained from the link table disposed in the main storage unit to be retrieved by the link table retrieval circuit 38. Therefore, the comparator 40 compares the high order segment number in the link table entry obtained by the retrieval of the link table by the link table retrieval circuit 38 with the high order segment number of the segment number holding register 28 to judge whether or not they coincide with each other. At the same time, the comparator 40 compares the process ID obtained from the link table entry with the process ID from the process ID holding register 90 to examine their coincidence. When coincidence of both of the process IDs and the high order segment numbers is obtained, the comparator 48 judges that the page table base address in the link table entry obtained at this time from the link table retrieval circuit 38 is correct, and outputs it to the adding circuit 50, by means of a switching operation of the selection circuit 42.

As to the retrieval of the auxiliary link table 24 of the main storage unit comprising the selection circuit 44, the auxiliary link table retrieval circuit 46 and the comparator 48, the process ID is stored as the effective data in the auxiliary link table entry in the same way as in the case of the link table 22, and the comparator 48 outputs the page table base address in the auxiliary link table entry as being correct when the coincidence result can be obtained between the high order segment number and the process ID, to the adding circuit 50. The rest are the same as in the first embodiment shown in FIGS. 9A and 9B.

Figure 15:
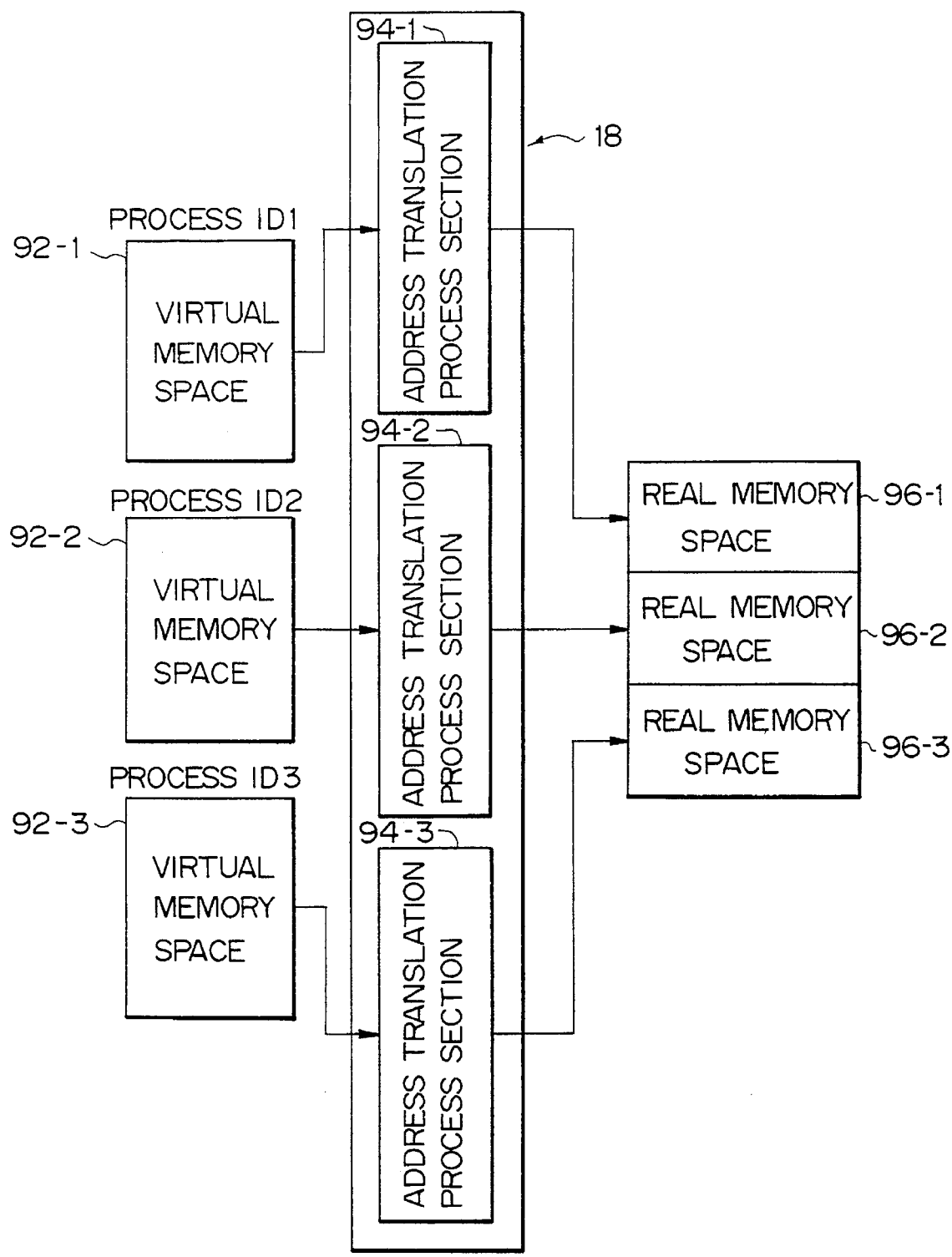
FIG. 15 is a block diagram showing the relationship between the virtual space and the real space for each process ID in the second embodiment shown in FIGS. 14A and 14B.

FIG. 15 is an explanatory view showing the relationship between the virtual memory space and the real memory space disposed for each process in the second embodiment shown in FIGS. 14A and 14B.

In the embodiment shown in FIG. 15, three processes, i.e., processes ID1 to ID3, are shown disposed by way of example, and virtual memory spaces 92-1 to 92-3 are disposed for each process. The address translation unit 18 translates the virtual address to the real address by the functions of the respective address translation process sections 94-1 to 94-3 designated by the process ID. The real space secured on the main storage unit 12 is constituted as independent real memory spaces 96-1 to 96-3 for each process.

Figure 16:
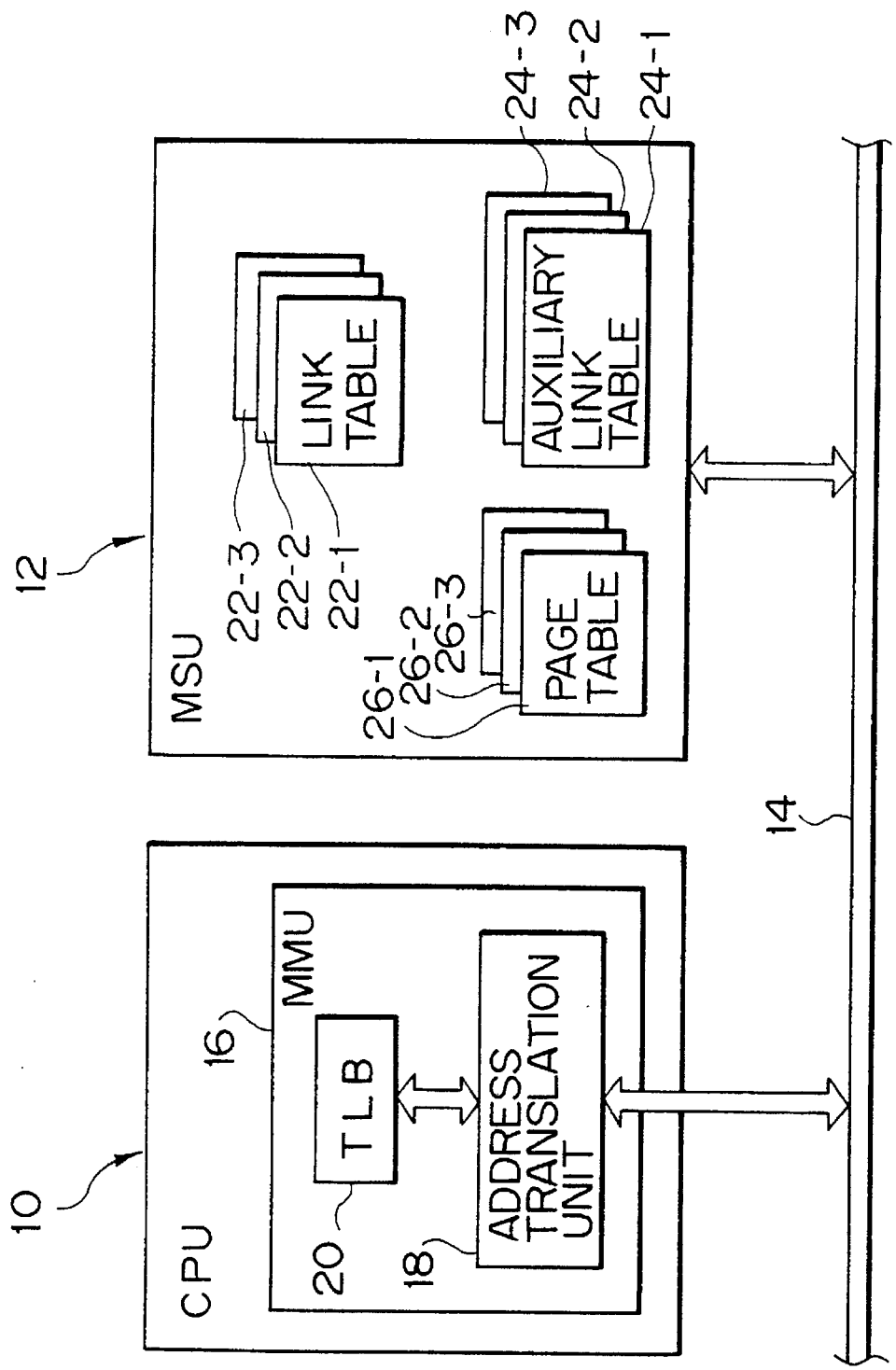
FIG. 16 is a block diagram showing the hardware configuration of a computer equipped with the address translation mechanism shown in FIGS. 14A and 14B.

FIG. 16 is an explanatory view showing the hardware configuration of the computer corresponding to the second embodiment shown in FIGS. 14A and 14B. The address translation unit 18 disposed in the memory management unit 16 of the central processing unit 10 accomplishes the functions of the address translation process section for each of the three processes as shown in FIG. 15. The link tables 22-1 to 22-3, the auxiliary link tables 24-1 to 24-3 and the page tables 26-1 to 26-3 are so disposed on the main storage unit 12 connected to the central processing unit 10 through the internal bus 14, as to correspond to the three precesses, respectively.

Accordingly, the CPU 10 can execute parallel processing without generating competition between the three processes during their address translation. In the embodiment shown in FIG. 16, only one central processing unit 10 is shown disposed, but a multiple CPU configuration using a plurality of CPUs may also be employed.

Figure 17A:
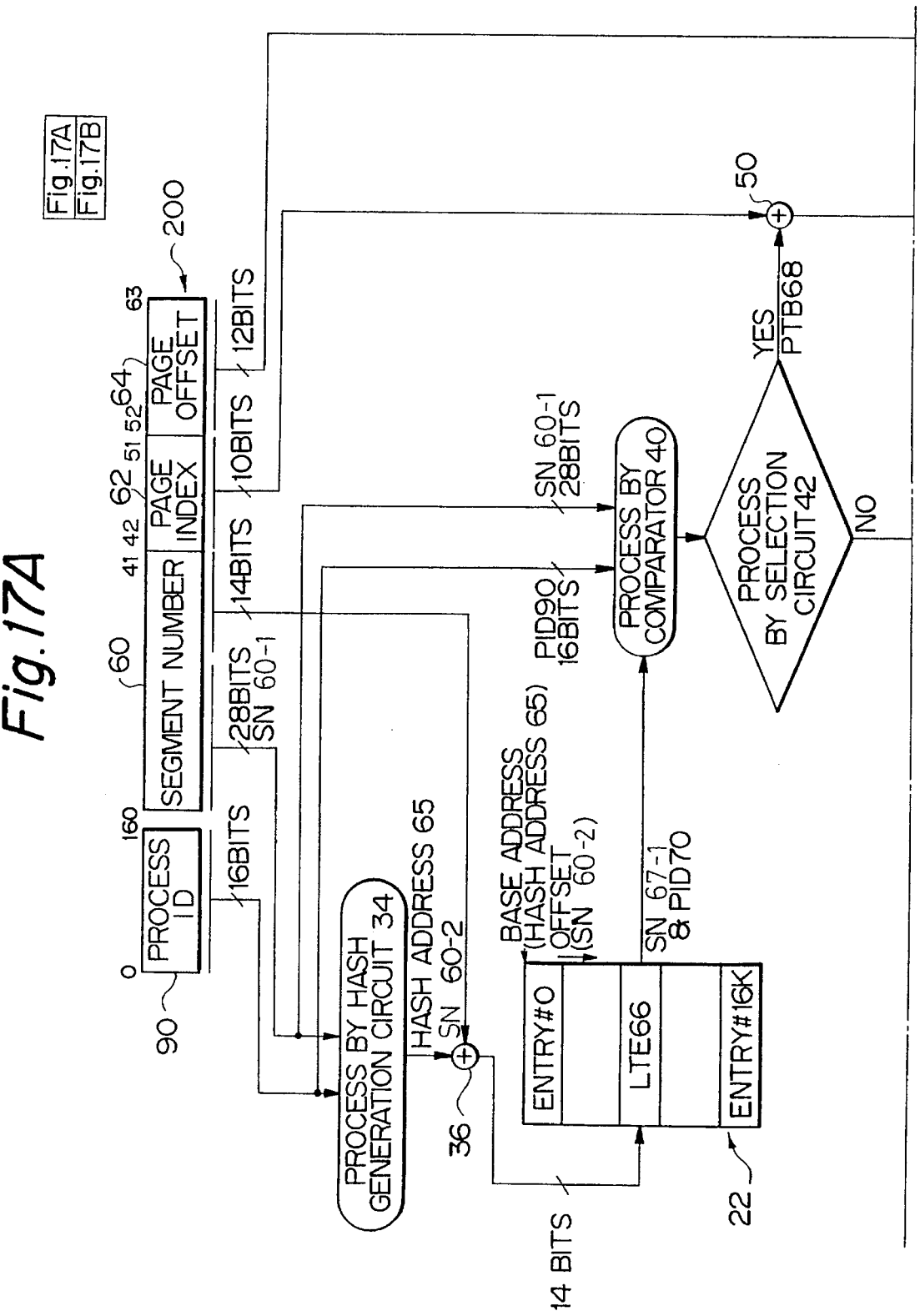
FIGS. 17A and 17B are block diagrams showing the address translation function according to the second embodiment shown in FIGS. 14A and 14B.
Figure 17B:
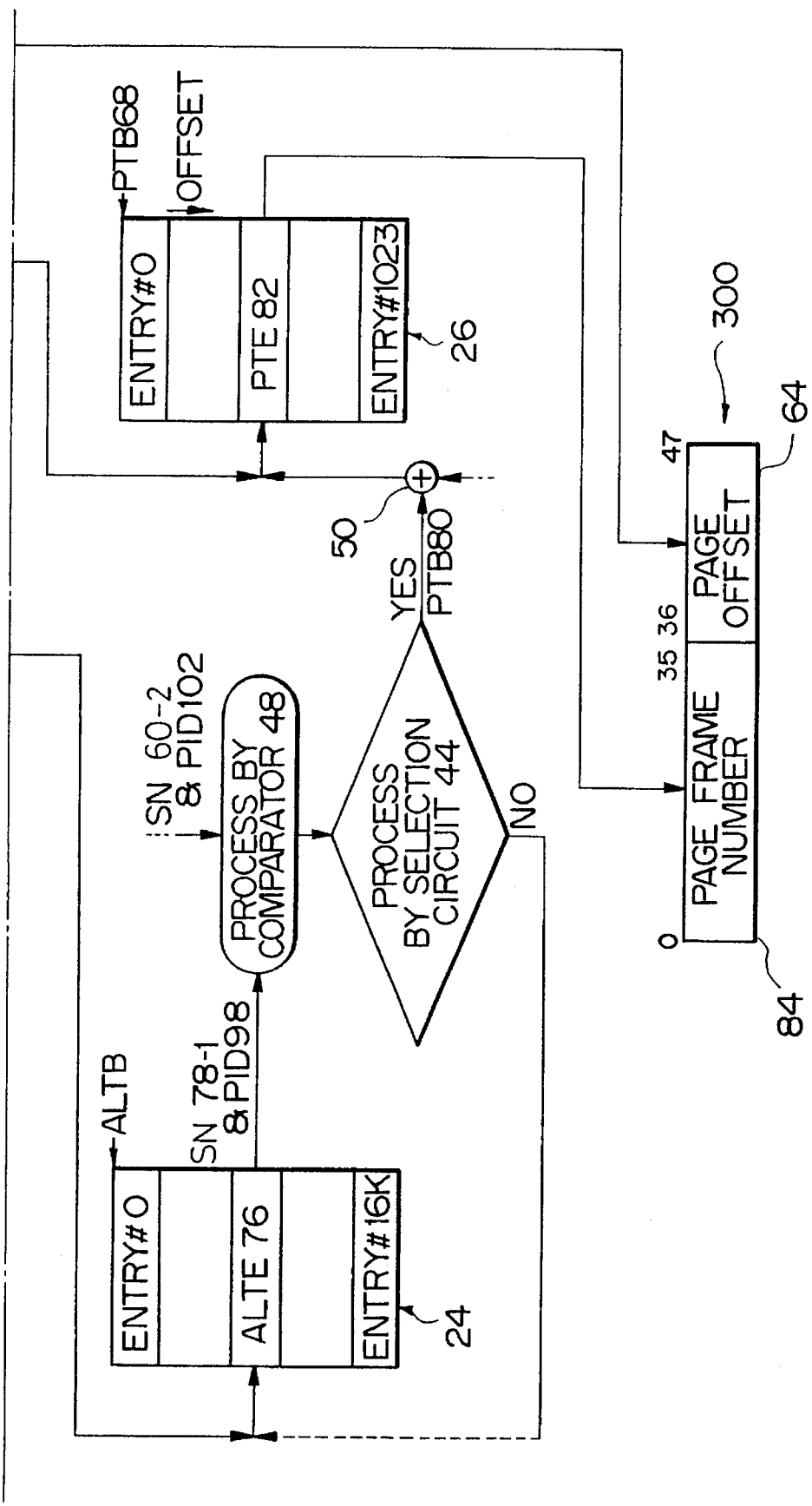

FIGS. 17A and 17B are explanatory views showing the address translation function from the 64-bit virtual address to the real address in the second embodiment shown in FIGS. 14A and 14B. In this case, the address translation function is illustrated in two drawings of FIGS. 17A and 17B.

In FIGS. 17A and 17B, the process ID 90 is held in addition to the 64-bit virtual address 20 as the translation object, and the process ID 90 and the high order segment number 60-1 in the virtual address 20 are input as the hash parameters to the hash generation circuit 34. The hash generation circuit 34 generates the hash address 65 as the base address of the link table 22.

Subsequently, the adding circuit 36 adds the lower order segment number 60-2 as the offset to the base address 65 of the link table 22 and generates the table address, and the link table entry 66 is obtained by retrieving the link table 22. This link table entry 66 contains the high order segment number 67-1 and the process ID 70 as shown in FIG. 11. Therefore, the comparator 40 compares the high order number 60-1 of the virtual address 200 to be translated with the process ID 90, and the page table base address 68 in the link table entry 66 is judged as being correct and is output to the adding circuit 50 when they coincide with each other.

When at least one of the process ID and the high order segment number is unequal in the processing by the comparator 40, the auxiliary link table 24 is retrieved by the link pointer 47 in the link table entry 66 and the auxiliary link table entry 76 is obtained. The high order segment number 78-1 in the auxiliary link table entry 76 and the process ID 98 are compared with the high order segment number 60-1 of the virtual address 200 and the ID 90, and the table is retrieved repeatedly until both of them coincide with one another and the correct page table base 80 can be obtained.

The correct page table base 68 obtained from the link table 22 or the correct page table base 80 obtained by the link table 24 is added by the adding circuit 50 using the page index in the virtual address 200 as the offset to generate the table address, and the page table 26 is retrieved.

The page table entry 82 can be obtained from the page table 26 and the page table entry 82 contains the page frame number 84 as shown in FIG. 12. Therefore, this frame number 84 is stored in the high order to the real address 300 and at the same time, the page offset 64 in the virtual address 200 is stored in the lower order of the real address 300. In this way, the 48-bit real address 300 is finally generated.

Here, in the first embodiment shown in FIGS. 9A and 9B and in the second embodiment shown in FIGS. 14A and 14B, the selection circuit 44, the auxiliary link table retrieval circuit 46 for retrieving the auxiliary link table and the comparator 48 are constituted by hardware. However, as still another embodiment of the present invention, these circuit portions may be accomplished by software and the hardware load on the address translation unit 18 may be reduced.

The embodiments given above deal with the case where the 64-bit virtual address exceeding 32 bits is taken as an example. However, the virtual address may be naturally a 36-bit, 48-bit or 128-bit virtual address. Though the embodiments given above deal with the case where the bit format of the virtual address is adapted to the bit format of the conventional 32-bit virtual address so as to establish compatibility by way of example, it may also be adapted to the bit format of a virtual address below 32 bits, such as a 24-bit or 16-bit virtual address.

As to the generation of the hash address, the high order 28 bits of the segment number are input as the hash parameter to obtain the hash address representing the base address of the link table 22, and the remaining lower order 14 bits of the segment number are added as the offset to the table base address so as to retrieve the link table 22. However, the number of the high order bits to be input as the hash parameter and the number of the lower order bits to be used as the offset may be selected appropriately.

According to the several preferred embodiments of the present invention given above, a virtual address analogous to the virtual memory system of the conventional 32-bit virtual address can be employed in a virtual memory system using a virtual address of more than 32 bits, such as a 64-bit virtual address. Accordingly, even when the address space is expanded to 64 bits, it is possible to introduce the concept of the segment in the same way as in the prior art system and to easily maintain compatibility with the virtual memory system using the virtual address of below 32 bits.

As soon as the table is retrieved by the hash address in the address translation, address comparison is immediately carried out to confirm whether or not the value of the lower order table base address value is correct. Accordingly, in comparison with the conventional address translation using the hash address in which address comparison is effected after the table is retrieved twice, the address translation can be accomplished at a higher rate.

While the present invention has thus been described as related to the preferred embodiments thereof, it will be understood that various changes and modifications may be made without departing from the spirit and the scope of the invention as hereinafter claimed.

We claim:

1. A method for translating a virtual address into a real address, comprising:

a virtual address holding step of holding a virtual address larger than 32 bits comprising a segment number, a page index formatted as in a virtual address not larger than 32 bits and a page offset formatted as in a virtual address not larger than 32 bits, said virtual address being held as a translational object in such a manner as to correspond to a structure having a virtual space divided into segment units, each segment region is divided into page units corresponding to a real space;

a hash processing step of generating a hash address from a part of said virtual address to serve as a base address of a link table;

a link table retrieving step of adding a predetermined number of lower order bits of said segment number as an offset, to said hash address, retrieving said link table to obtain tag information of said virtual address, a base address of a page table and a link pointer used for retrieving an auxiliary link table and, outputting said base address of said page table as a correct base address when said tag information of said virtual address coincides with a predetermined number of higher order bits of said segment number;

an auxiliary link table retrieving step of retrieving said auxiliary link table by said link pointer when said tag information does not coincide with said predetermined number of higher order bits of said segment number to obtain tag information of a next virtual address, a base address of a next page table and a next link pointer, and continuing retrieval of said auxiliary link table on the basis of said link pointer until a correct base address of said page table is obtained;

a page table retrieving step of adding, as an offset, a part of said virtual address to said base address of said page table obtained in said link table retrieving step or in said auxiliary link table retrieving step so as to retrieve said page table, and obtaining a page frame number; and a real address generating step of combining a part of said virtual address as an offset with said page frame number obtained in said page table retrieving step, and generating a real address.

2. A method as set forth in claim 1, wherein said hash processing step generates said hash address using a predetermined number of high order bits of said segment number of said virtual address.

3. A method as set forth in claim 1, wherein said auxiliary link table retrieving step judges whether said base address of said page table is correct by comparing said tag information of a virtual address obtained from said auxiliary link table with a predetermined number of high order bits of said segment number.

4. A method as set forth in claim 1, wherein said page table retrieving step retrieves said page table by adding said page index of said virtual address as an offset to said base address of said page table obtained in said link table retrieving step or in said auxiliary link table retrieving step.

5. A method as set forth in claim 1, wherein said real address generation step generates said real address by combining said page offset of said virtual address with said page frame number obtained by said page table retrieving step.

6. An apparatus for translating a virtual address into a real address, comprising:

a virtual address holding means for holding a virtual address larger than 32 bits comprising a segment number, a page index formatted as in a virtual address not larger than 32 bits and a page offset formatted as in a virtual address not larger than 32 bits, in such a manner as to correspond to a structure having a virtual space divided into segment units, each segment region is divided into page units corresponding to a real space;

1 hash generation means for generating a hash address from a part of said virtual address to serve as a base address of a link table;

a link table retrieving means for adding a predetermined number of lower order bits of said segment number as an offset, to said hash address, retrieving said link table to obtain tag information of said virtual address, a base address of a page table and a link pointer used for retrieving an auxiliary link table and, outputting said base address of said page table as a correct base address when said tag information of said virtual address coincides with a predetermined number of higher order bits of said segment number;

auxiliary link table retrieving means for retrieving said auxiliary link table by said link pointer when said tag information does not coincide with said predetermined number of higher order bits of said segment number to obtain tag information of a next virtual address, a base address of a next page table and a next link pointer, and continuing retrieval of said auxiliary link table on the basis of said link pointer until a correct base address of said page table is obtained;

a page table retrieving means for adding, as an offset, a part of said virtual address to said base address of said page table obtained by said link table retrieving means or by said auxiliary link table retrieving means so as to retrieve said page table, and obtaining a page frame number; and a real address generation means for combining a part of said virtual address as an offset with said page frame number obtained by said page table retrieving means, and generating a real address.

7. An apparatus as set forth in claim 6, wherein said hash generating means generates said hash address using a predetermined number of high order bits of said segment number of said virtual address.

8. An apparatus as set forth in claim 6, wherein said auxiliary link table retrieving means judges whether said base address of said page table is correct by comparing said tag information of a virtual address obtained from said auxiliary link table with a predetermined number of high order bits of said segment number.

9. An apparatus as set forth in claim 6, wherein said page table retrieving means retrieves said page table by said page index of said virtual address as an offset to said base address of said page table obtained by said link table retrieving means or by said auxiliary link table retrieving means.

10. An apparatus as set forth in claim 6, wherein said real address generating means generates said real address by combining said page offset of said virtual address with said page frame number obtained by said page table retrieving means.

11. A method for translating a virtual address into a real address, comprising:

a process ID holding step of holding an ID number of a process for address translation;

a virtual address holding step of holding a virtual address larger than 32 bits comprising a segment number, a page index formatted as in a virtual address not larger than 32 bits and a page offset formatted as in a virtual address not larger than 32 bits, said virtual address being held as translational object in such a manner as to correspond to a structure having a virtual space divided into segment units, each segment region is divided into page units corresponding to a real space;

a hash processing step of generating a hash address from said process ID and a part of said virtual address to serve as a base address of a link table;

a link table retrieving step of adding a predetermined number of lower order bits of said segment number to said hash address, retrieving said link table to obtain said process ID, tag information of said virtual address, a base address of a page table and a link pointer used for retrieving an auxiliary link table and, outputting said base address of said page table as a correct base address when said process ID obtained by said table retrieval coincides with said process ID held by said process ID holding step and said tag information of said virtual address obtained by said table retrieval coincides with a predetermined number of higher order bits of said segment number;

an auxiliary link table retrieving step of retrieving said auxiliary link table by said link pointer when at least one of said tag information and said process ID obtained in said link table retrieving step does not coincide, to thereby obtain a next process ID, tag information of a next virtual address, a base address of a next page table and a next link pointer, and continuing retrieval of said auxiliary link table on the basis of said link pointer until a correct base address of said page table is obtained;

a page table retrieving step of adding, as an offset, a part of said virtual address to said base address of said page table obtained in said link table retrieving step or in said auxiliary link table retrieving step so as to retrieve said page table, and obtaining a page frame number; and a real address generating step of combining a part of said virtual address as an offset with said page frame number obtained in said page table retrieving step, and generating a real address.

12. A method as set forth in claim 11, wherein said hash processing step generates said hash address using said process ID number and a predetermined number of high order bits of said segment number of said virtual address.

13. A method as set forth in claim 11, wherein said auxiliary link table retrieving step judges whether said base address of said page table is correct by comparing said tag information of virtual address obtained from said auxiliary link table with a predetermined number of high order bits of said segment number.

14. A method as set forth in claim 11, wherein said page table by adding said page index of said virtual address as an offset to said base address of said page table obtained in said link table retrieving step or in said auxiliary link table retrieving step.

15. A method as set forth in claim 11, wherein said real address generation step generates said real address by combining said page offset of said virtual address with said page frame number obtained by said page table retrieving step.

16. An apparatus for translating a virtual address into a real address, comprising:

process ID holding means for holding an ID number of process for address translation;

virtual address holding means for holding a virtual address larger than 32 bits comprising a segment number, a page index formatted as in a virtual address not larger than 32 bits and a page offset formatted as in a virtual address not larger than 32 bits, said virtual address being held as a translational object in such a manner as to correspond to a structure having a virtual space divided into segment units, and each segment region is divided into page units corresponding to a real space;

hash generation means for generating a hash address from said process ID and a part of said virtual address to serve as a base address of a link table;

link table retrieving means for adding a predetermined number of lower order bits of said segment number to said hash address, retrieving said link table to obtain said process ID, tag information of said virtual address, a base address of a page table and a link pointer used for retrieving an auxiliary link table and, outputting said base address of said page table as a correct base address when said process ID obtained by said table retrieval coincides with said process ID held by said process ID holding means and said tag information of said virtual address obtained by said table retrieval coincides with a predetermined number of higher order bits of said segment number;

an auxiliary link table retrieving means for retrieving said auxiliary link table by said link pointer when at least one of said tag information and said process ID obtained by said link table retrieving means does not coincide, to thereby obtain a next process ID, tag information of a next virtual address, a base address of a next page table and a next link pointer, and continuing retrieval of said auxiliary link table on the basis of said link pointer until a correct base address of said page table is obtained;

page table retrieving means for adding, as an offset, a part of said virtual address to said base address of said page table obtained by said link table retrieving means or by said auxiliary link table retrieving means so as to retrieve said page table, and obtaining a page frame number; and real address generation means for combining a part of said virtual address as an offset with said page frame number obtained by said page table retrieving means, and generating a real address.

17. An apparatus as set forth in claim 16, wherein said hash generation means generates said hash address using a process ID number and a predetermined number of high order bits of said segment number of said virtual address.

18. An apparatus as set forth in claim 16, wherein said auxiliary link table retrieving means judges whether said base address of said page table is correct by comparing said tag information of a virtual address obtained from said auxiliary link table with a predetermined number of high order bits of said segment number.

19. An apparatus as set forth in claim 16, wherein said page table retrieving means retrieves said page table by adding said page index of said virtual address as an offset to said base address of said page table obtained by said link table retrieving means or by said auxiliary link table retrieving means.

20. An apparatus as set forth in claim 16, wherein said real address generation means generates said real address by combining said page offset of said virtual address with said page frame number obtained by said page table retrieving means.

* * * * *

UNITED STATES PATENT AND TRADEMARK OFFICE
CERTIFICATE OF CORRECTION

PATENT NO. : 5,584,005
DATED : December 10, 1996
INVENTOR(S) : Hitoshi MIYAOKU, et al.

It is certified that error appears in the above-indentified patent and that said Letters Patent is hereby corrected as shown below:

Column 15, line 56, delete "1" and insert -- a --.

Column 17, line 31, after "of" insert -- a --.

Signed and Sealed this

Eighth Day of April, 1997

Attest:

BRUCE LEHMAN

*Attesting Officer*  *Commissioner of Patents and Trademarks*